(12) United States Patent
Bharadwaj et al.

(10) Patent No.: US 11,784,504 B2
(45) Date of Patent: Oct. 10, 2023

(54) METHOD FOR DETERMINING PARAMETERS OF A SIMPLIFIED MODEL OF AN ENERGY STORAGE SYSTEM, CONTROL METHOD USING SUCH A MODEL AND ASSOCIATED DEVICE

(71) Applicant: Commissariat à l'énergie atomique et aux énergies alternatives, Paris (FR)

(72) Inventors: Kangkana Bharadwaj, Chambery (FR); Franck Al Shakarchi, Saint Sulpice (FR); Franck Bourry, Entre-Deux-Guiers (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 778 days.

(21) Appl. No.: 16/757,257

(22) PCT Filed: Oct. 12, 2018

(86) PCT No.: PCT/EP2018/077960
§ 371 (c)(1),
(2) Date: Apr. 17, 2020

(87) PCT Pub. No.: WO2019/076776
PCT Pub. Date: Apr. 25, 2019

(65) Prior Publication Data
US 2021/0194259 A1      Jun. 24, 2021

(30) Foreign Application Priority Data
Oct. 20, 2017   (FR) ...................................... 1759892

(51) Int. Cl.
*G05D 3/12*     (2006.01)
*G05D 5/00*     (2006.01)
(Continued)

(52) U.S. Cl.
CPC .......... *H02J 7/0048* (2020.01); *G05B 13/042* (2013.01)

(58) Field of Classification Search
CPC ...... H02J 7/0048; G05B 13/042; G06F 30/20; G06F 2119/06
See application file for complete search history.

(56) References Cited

U.S. PATENT DOCUMENTS

| 10,422,824 B1* | 9/2019 | Plett .................... G01R 31/3842 |
| 2013/0154653 A1* | 6/2013 | Boehm .............. G01R 31/3647 324/426 |

(Continued)

OTHER PUBLICATIONS

International Search Report as issued in International Patent Application No. PCT/EP2018/077960, dated Dec. 13, 2018.
(Continued)

*Primary Examiner* — Zhipeng Wang
(74) *Attorney, Agent, or Firm* — Pillsbury Winthrop Shaw Pittman LLP

(57) ABSTRACT

A method for determining parameters of a simplified model of an energy storage system, including an energy storage device and a conversion device, the system being modelled by a complex model including models of the energy storage and conversion devices; the complex model receiving a setpoint power $P_{ac\_sp}$ and a state of charge $SOC_p$ at input and providing the state of charge SOC of the storage device and the power $P_{ac}$ at the output of the storage device at output; the method including implementing simulations of the energy storage system using the complex model; calculating (a) a table of the variation in the state of charge of the system as a function of the setpoint power and of a state of charge, (b) a table of maximum power as a function of the state of charge; (c) a table of minimum power as a function of the state of charge.

9 Claims, 8 Drawing Sheets

(51) Int. Cl.
  *G05D 9/00* (2006.01)
  *G05D 11/00* (2006.01)
  *G05D 17/00* (2006.01)
  *H02J 7/00* (2006.01)
  *G05B 13/04* (2006.01)

(56) References Cited

U.S. PATENT DOCUMENTS

2018/0120361 A1* 5/2018 Choi ................... H02J 7/00302
2018/0131200 A1* 5/2018 Crawford ........... G05B 23/0294

OTHER PUBLICATIONS

Hernandez-Torres, D., et al., "Energy flow modeling of a Li-Ion battery with a view to technical and economic optimization of an intelligent micro-network," Symposium de Genie Electrique (SGE 2016), Jun. 2016, XP055490232, pp. 1-8.
Bourry, F., et al., "Simulation for the evaluation of energy management algorithms at the district level—Example of use case from the Ambassador project," 2015 IEEE Eindhoven Powertech, Jun. 2015, XP033215704, pp. 1-6.

* cited by examiner

METHOD FOR DETERMINING PARAMETERS OF A SIMPLIFIED MODEL OF AN ENERGY STORAGE SYSTEM, CONTROL METHOD USING SUCH A MODEL AND ASSOCIATED DEVICE

CROSS-REFERENCE TO RELATED APPLICATIONS

This is the U.S. National Stage of PCT/EP2018/077960, filed Oct. 12, 2018, which in turn claims priority to French Application No. 1759892, filed Oct. 20, 2017, the entire contents of all applications are incorporated herein by reference in their entireties.

TECHNICAL FIELD OF THE INVENTION

The technical field of the invention is that of energy management. The present invention relates to a method for determining parameters of a physical model and in particular a method for determining parameters of a simplified model of an energy storage system.

TECHNOLOGICAL BACKGROUND OF THE INVENTION

Within the scope of renewable energies, it is essential to optimise energy storage and use of this stored energy to mitigate the intermittent nature of some energy sources such as wind turbines or photovoltaic panels. The storage is generally ensured by an energy storage system comprising a storage device in charge of the energy storage per se and a conversion device which will ensure the charge or discharge of the storage device as well as the conversion of energy stored in a form adapted to a household or industrial use, for example by converting direct current into alternating current. It is to be noted that a storage device often includes auxiliary systems which can be associated to the storage device or conversion device. In the rest of the text, when a storage system is referred to, these auxiliary systems are considered as being included in said storage system.

In order to drive such a storage system efficiently, it is essential to foresee the behaviour thereof so as to anticipate charge, discharge as well as the power the device can provide or absorb. This driving is made by updating operating setpoints, said update being made at regular intervals, generally in the order of one minute or even of one hour. In order to determine setpoints adapted to the facility driving, it is thus necessary to simulate the behaviour of the storage system before setting each new setpoint. For this, a model representing the storage device and a model representing the conversion device are assembled so as to make up a complex model. In order to drive the energy storage system, it may seem reasonable to perform a simulation with a time step of the same order of magnitude as the driving time step (i.e. a few minutes or even a few hours), the simulation thus performed enabling a setpoint to be generated. However, it is generally necessary to adopt a time step much lower than the driving time step (i.e. in the order of one second or even millisecond) in order to achieve a sufficient accuracy to generate a reliable setpoint. Thus, for each new setpoint, it is necessary to perform a computational-and-memory-intensive simulation.

There is thus a need for a driving method in which setpoints are generated by resorting to a simulation the time step of which is of the same order of magnitude as the driving time step itself, and which thus requires a lesser computational power (or a lesser computational time for a given computational power) while providing a sufficient accuracy. There is thus a need for a simplified model enabling such a driving method to be implemented.

SUMMARY OF THE INVENTION

The invention offers a solution to the above-discussed problems, by enabling a simplified model the simulation time of which is limited, to be obtained. Indeed, the simplified model obtained using a method according to the invention enables a simulation of an energy storage system to be performed with a time step of the same order of magnitude as the driving time step of said system, while providing accuracy of the simulated results which is similar to that achieved with a simulation having a much smaller time step than the driving time step itself.

A first aspect of the invention relates to a method for determining parameters of a simplified model of an energy storage system, said system comprising an energy storage device and a conversion device, wherein said system being able to be modelled by means of a complex model including a model of the energy storage device and a model of the conversion device; said complex model receiving as an input a power setpoint $P_{ac\_sp}$ and a state of charge $SOC_p$, and outputting the state of charge SOC of the storage device as well as the power $P_{ac}$ output from the storage device; said method being characterised in that it comprises:
- a first step of implementing a plurality of simulations of the energy storage system using the complex mode, each simulation being for example performed with a time step $\Delta t$;
- a second step of calculating from the results obtained during the first step:
  - a state of charge time variation table of the system as a function of the power setpoint $P_{ac\_sp}$ and the state of charge SOC;
  - a maximum power table provided as a function of the state of charge SOC;
  - a minimum power table provided as a function of the state of charge SOC.

The simplified model obtained enables a power $P_{ac}$ and a state of charge of the system SOC to be assigned as a function of an input power setpoint $P_{ac\_sp}$ and an input state of charge $SOC_p$, and from the tables determined during the second step.

In the thereafter, by convention, the power $P_{ac}$ upon charging is considered as negative and the power $P_{ac}$ upon discharging is considered as positive. By means of the invention, it is no longer necessary to choose between a simulation time step of the same order of magnitude as the driving time step (i.e. the duration separating two updates of the driving setpoints) resulting in an unsatisfactory accuracy, and a much lower simulation time step enabling a certainly accurate, but computational-and-memory-intensive simulation. Indeed, the simplified model obtained using a method according to a first aspect of the invention enables a simulation time step of the same order of magnitude as the driving time step to be adopted while keeping a sufficient accuracy for said driving.

Besides the characteristics just discussed in the previous paragraph, the method according to a first aspect of the invention can have one or more further characteristics from the following ones, considered individually or according to any technically possible combinations.

Advantageously, each value of the state of charge variation table of the system is obtained using a simulation with a duration $t_{ESS}$ performed for a given state of charge SOC(j) and a given power setpoint $P_{ac\_sp}(i)$ which belongs to a first sub-set of the plurality of simulations, said value being:
  equal to the state of charge variation ΔSOC value obtained during said simulation over the time $t_{ESS}$ if the mean power $<P_{ac}>$ during said simulation is equal to the power setpoint $P_{ac\_sp}$
  otherwise, equal to:

$$interp\left\{[P_{ac\_sp}(i-1), \langle P_{ac}(i,j)\rangle], \left[\frac{dSOC(i-1,j)}{dt}, \frac{\Delta SOC(i,j)}{t_{ESS}}\right], P_{ac\_sp}(i)\right\}$$

with:

$$\frac{dSOC(i-1,j)}{dt},$$

the charge variation obtained or calculated during the simulation corresponding to the state of charge SOC(j) and to a power setpoint $P_{ac\_sp}(i-1)$;
ΔSOC(i,j), the charge variation obtained during the simulation corresponding to the state of charge SOC(j) and to a power setpoint $P_{ac\_sp}(i)$;
$<P_{ac}(i,j)>$, the mean value of the power $P_{ac}$ during the simulation corresponding to the state of charge SOC(j) and to a power setpoint $P_{ac\_sp}(i)$;
interp $\{[x_0, x_1], [y_0, y_1], x\}$ is the function which determines the y value corresponding to the x value by interpolation from the $x_0$, $x_1$, $y_0$ and $y_1$ values.

Thus, it is possible to set the state of charge time variation corresponding to a given simulation even when the latter is not constant during said simulation. By equal, it is meant that the power $P_{ac}$ is equal to the power setpoint $P_{ac\_sp}$ within 5%, or even within 2%, preferably within 1%.

Alternatively, each value of the state of charge variation table of the system is obtained using a simulation with a duration $t_{ESS}$ performed for a given state of charge SOC(j) and a given power setpoint $P_{ac\_sp}(i)$ which belongs to a first sub-set of the plurality of simulations, said value being equal to the state of charge variation ΔSOC value obtained during said simulation over the time $t_{ESS}$.

Thus, it is possible to set the state of charge time variation corresponding to a given simulation even when the latter is not constant during said simulation by resorting to an only slightly computational-intensive approximation. Indeed, the inventors have revealed that this approximation surprisingly enables very good results to be obtained.

Further alternatively, each value of the state of charge variation table of the system is obtained using a simulation with a duration $t_{ESS}$ performed for a given state of charge SOC(j) and a given power setpoint $P_{ac\_sp}(i)$ which belongs to a first sub-set of the plurality of simulations, said value being:
  equal to the state of charge variation ΔSOC value obtained during said simulation over the time $t_{ESS}$ if the mean power $<P_{ac}>$ during said simulation is equal to the power setpoint $P_{ac\_sp}$
  otherwise, equal to $$\frac{dSOC(m,j)}{dt}$$

where $$\frac{dSOC(m,j)}{dt}$$

is the charge time variation obtained during the simulation corresponding to the state of charge $SOC_i(j)$ and to a power setpoint $P_{ac\_sp}(m)$, $P_{ac\_sp}(m)$ being the power setpoint closest to the power setpoint $P_{ac\_sp}(i)$ for which the mean power $<P_{ac}>$ during said simulation is equal to the power setpoint $P_{ac\_sp}(m)$.

Thus, it is possible to set the state of charge time variation corresponding to a given simulation even when the latter is not constant during said simulation by resorting to an only slightly computational-intensive approximation.

Advantageously, each simulation of the first sub-set of simulations is performed for a given state of charge SOC(j) and a given power setpoint $P_{ac\_sp}(i)$ and in that each state of charge $SOC_i(j)$ is separated from the previous one SOC(j−1) and/or the next one SOC(j+1) by an adaptive state of charge step and/or each power setpoint $P_{ac\_sp}(i)$ is separated from the previous one $P_{ac\_sp}(i-1)$ and/or the next one $P_{ac\_sp}(i+1)$ by an adaptive power setpoint step.

Thus, the number of simulations performed in order to make up the state of charge time variation table is reduced.

Advantageously, the simulation step is repeated for a plurality of durations $t_{ESS}$. Thus, it is possible to integrate a time variable in the simplified model.

Advantageously, the plurality of simulations includes a simulation performed with an initial state of charge $SOC_{ini}$ equal to the maximum state of charge $SOC_{max}$, a duration equal to the duration necessary for fully discharging the storage system $t_{Dch}$ and a positive infinite power setpoint $P_{ac\_sp}$ and calculating the maximum power table PAC_MAX_TC as a function of the state of charge SOC includes:
  a step of determining periods with a duration $t_{ESS}$ within said simulation, each period being identified by means of a positive integer k;
  for each of these periods, a step of determining the state of charge $SOC_k$ at the beginning of the period k and the mean power $<P_{ac}>_k$ during the period k.

Thus, the plurality of couples ($SOC_k$, $<P_{ac}>_k$) makes up the maximum power table PAC_MAX_TC provided as a function of the state of charge SOC. By a positive infinite power setpoint $P_{ac\_sp}$, it is meant a power setpoint $P_{ac\_sp}$ which is much higher, in absolute value, than the power the system can provide. As a reminder, by convention, a positive value of the power $P_{ac}$ is associated with discharging the storage system.

Advantageously, the plurality of simulations includes a simulation performed with an initial state of charge $SOC_{ini}$ equal to the minimum state of charge of $SOC_{min}$, a duration equal to the duration necessary for fully charging the storage system $t_{Ch}$ and a negative infinite power setpoint $P_{ac\_sp}$, and calculating the minimum power table provided as a function of the state of charge SOC includes:
  a step of determining periods with a duration $t_{ESS}$ within said simulation, each period being identified by means of a positive integer k';
  for each of these periods, a step of determining the state of charge $SOC_{k'}$ at the beginning of the period k' and the mean power $<P_{ac}>_{k'}$ during the period k';

Thus, the plurality of couples ($SOC_{k'}$, $<P_{ac}>_{k'}$) makes up the minimum power table provided as a function of the state of charge SOC. By a negative infinite power setpoint $P_{ac\_sp}$, it is meant a power setpoint $P_{ac\_sp}$ much higher, in absolute value, than the power the system can receive upon charging. As a reminder, by convention, a negative value of the power $P_{ac}$ is associated with charging the storage system.

A second aspect of the invention relates to a method for driving an energy storage system calculating operating setpoints of said system from a model of said system, said model is obtained using a method according to a first aspect of the invention.

A third aspect of the invention relates to a device for driving an energy storage system comprising means for sending operating setpoints to the energy storage system, means for receiving data relating to the operation of the energy storage system and means for implementing a regulation method according to a second aspect of the invention.

A fourth aspect of the invention relates to a computer program product comprising instructions which, when the program is run on a computer, cause the same to implement the steps of the method according to a first aspect of the invention.

A fifth aspect of the invention relates to a computer program product comprising instructions which cause the driving device according to a third aspect of the invention to perform the steps of the method according to a second aspect of the invention.

A sixth aspect of the invention relates to a computer readable medium, on which the computer program according to a fourth or a fifth aspect of the invention is recorded.

The invention and its different applications will be better understood upon reading the following description and upon examining the accompanying figures.

BRIEF DESCRIPTION OF THE FIGURES

The figures are set forth for indicating and in no way limiting purposes of the invention.

DETAILED DESCRIPTION OF AT LEAST ONE EMBODIMENT OF THE INVENTION

Unless otherwise indicated, a same element appearing on different figures has a single reference.

Figure 1:
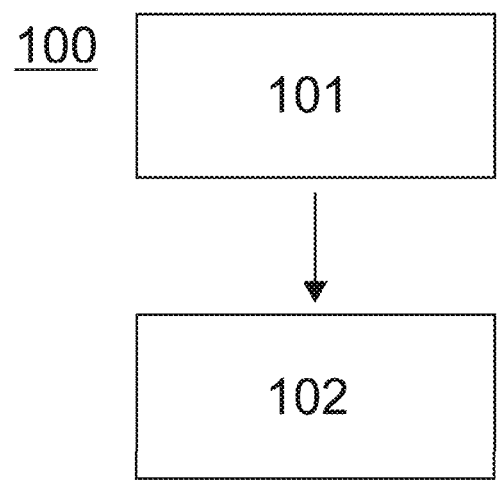
FIG. 1 shows a flowchart of one embodiment of a method according to a first aspect of the invention.
Figure 2:
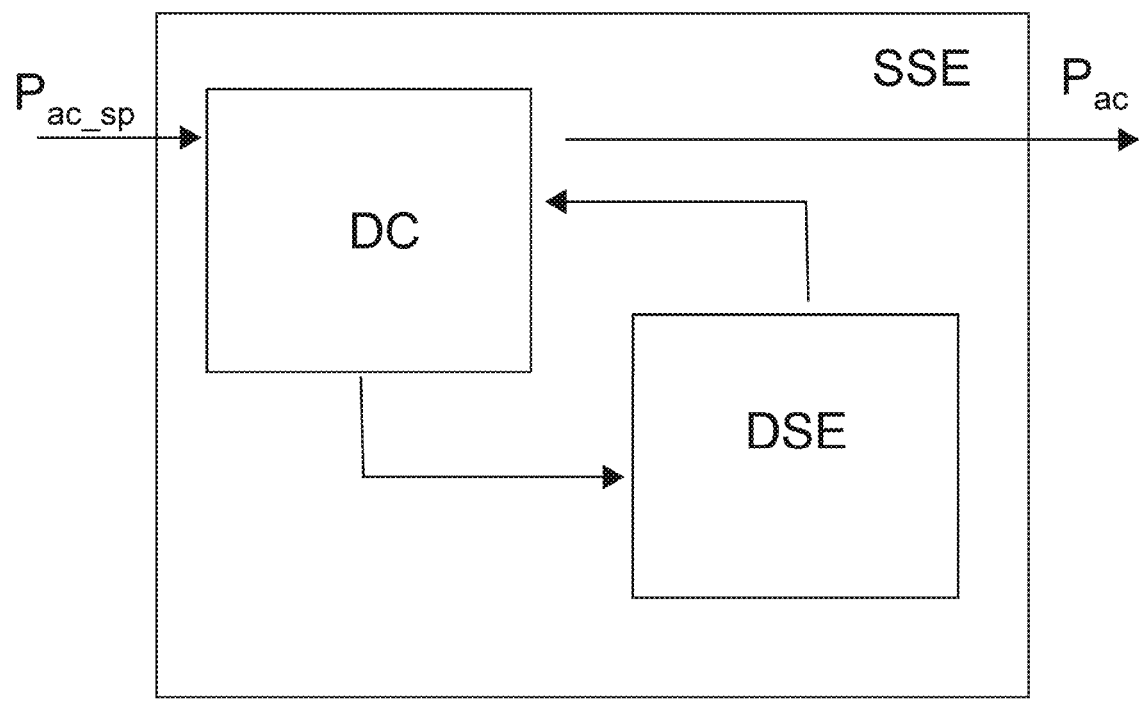
FIG. 2 shows a schematic representation of an energy storage system.
Figure 3:
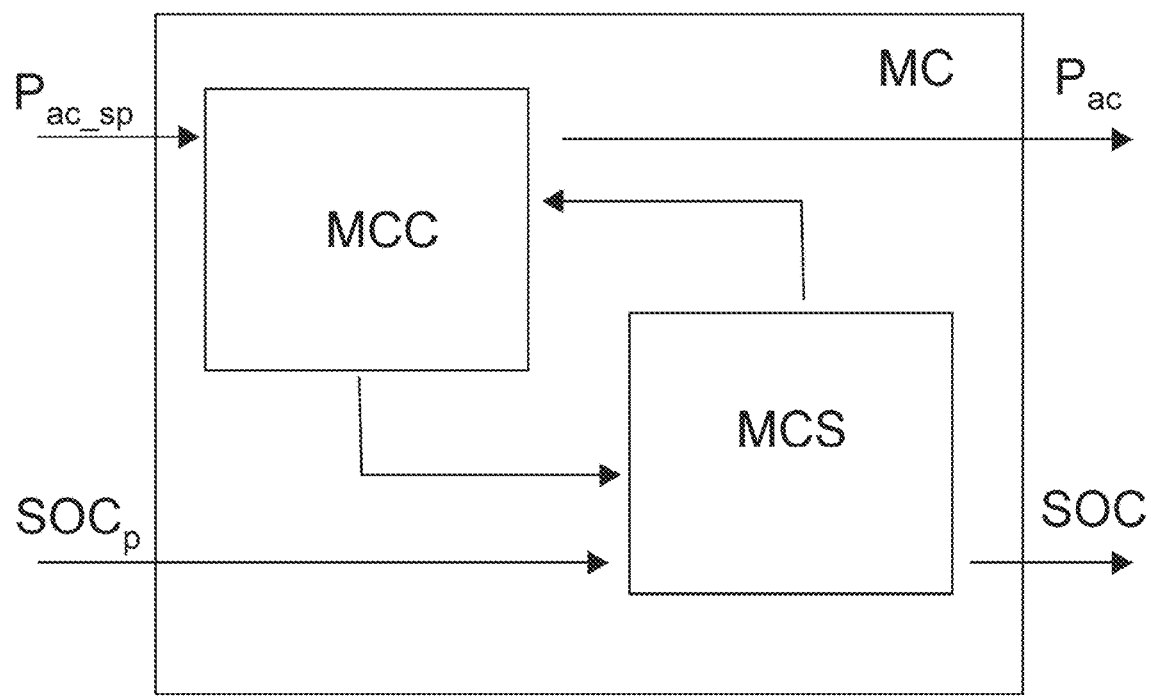
FIG. 3 shows a block diagram of a method according to a first aspect of the invention.
Figure 3:
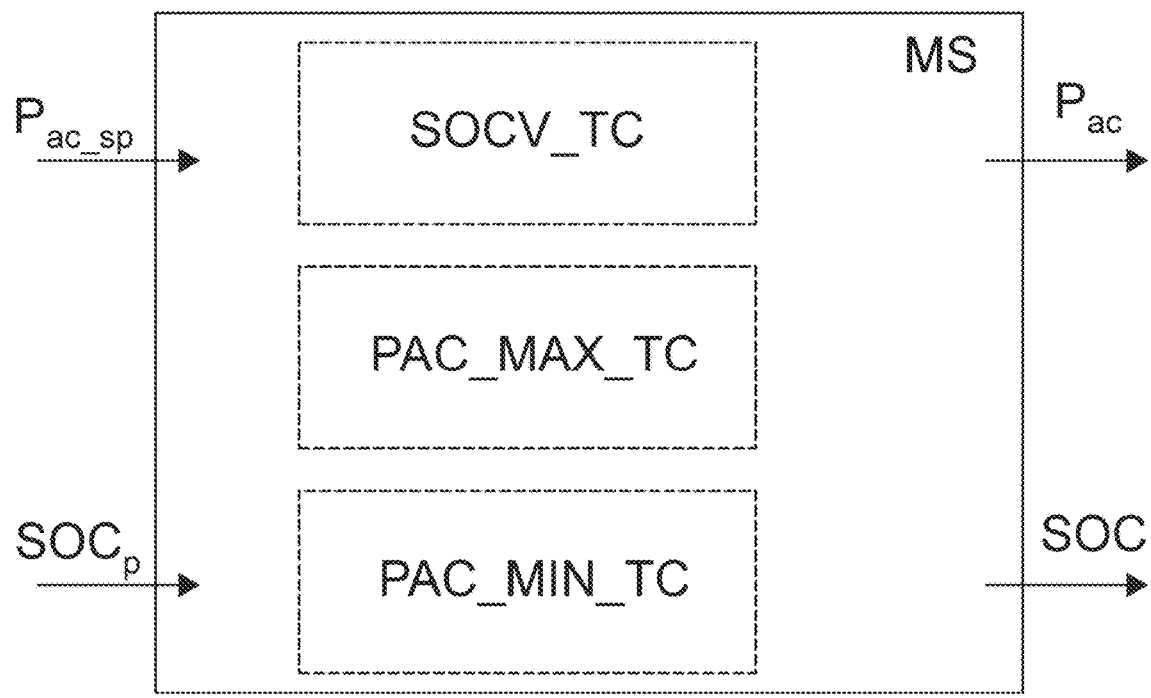

A first embodiment of a method according to a first aspect of the invention illustrated in FIG. 1 relates to a method 100 for determining parameters of a simplified model MS of an energy storage system ESS. The energy storage system ESS illustrated in FIG. 2 comprises an energy storage device DSE, for example a battery, and a conversion device DC and can be modelled using a complex model MC illustrated in FIG. 3 including a model of the energy storage device MCS and a model of the conversion device MCC. The complex model MC receives as an input a power setpoint $P_{ac\_sp}$ and a state of charge $SOC_p$, and outputs the state of charge SOC of the storage device as well as the power $P_{ac}$ output from the energy storage system. The method 100 according to the invention comprises a first step 101 of implementing a plurality of simulations of the energy storage system SSE using the complex model MC, each simulation being for example performed with a time step $\Delta t$. During these simulations, the state of charge $SOC_p$ input to the complex model is the initial state of charge of the system for the first iteration and then, for next iterations, the state of charge calculated during the previous iteration.

The method according to a first aspect of the invention also comprises a second step 102 of calculating from the results obtained in the first step 101:

a table SOCV_TC of the state of charge time variation $$\frac{dSOC}{dt}$$

of the system as a function of the power setpoint $P_{ac\_sp}$ and the state of charge SOC;

a maximum power table PAC_MAX_TC as a function of the state of charge SOC;

a minimum power table PAC_MIN_TC as a function of the state of charge SOC.

As a reminder, by convention, the power $P_{ac}$ upon charging is considered as negative because it is absorbed and the power $P_{ac}$ upon discharging is considered as positive because it is provided outside the system considered. Thus, for a given state of charge, the minimum power makes up the minimum power $P_{ac\_min}$ (negative) that the system can absorb for said state of charge and the maximum power provided makes up the maximum power $P_{ac\_max}$ (positive) that the system can provide for said state of charge.

The simplified model obtained enables a power $P_{ac\_sp}$ and a state of charge SOC of the system to be assigned as a function of an input power setpoint $P_{ac\_sp}$ and an input state of charge $SOC_p$, and from the tables SOCV_TC, PAC_MAX_TC, PAC_MIN_TC determined during the second step 102. Indeed, from a power setpoint $P_{ac\_sp}$ as well as a state of charge $SOC_p$ input to the model, it is possible to determine the minimum power using the minimum power table PAC_MIN_TC and the maximum power using the maximum power table PAC_MAX_TC. If the power setpoint $P_{ac\_sp}$ is located in this interval, then the power delivered by the system is equal to said setpoint $P_{ac\_sp}$, otherwise it is equal to the limit value closest to said setpoint. It is also possible, from the input power setpoint $P_{ac\_sp}$ once it is saturated and the input state of charge $SOC_p$, to determine the state of charge time variation $$\frac{dSOC}{dt}$$

using the table SOCV_TC of the state of charge time variation $$\frac{dSOC}{dt}$$

of the energy storage system ESS. The input state of charge $SOC_p$ may for example correspond to a state of charge of a previous iteration when the simplified model is used to perform a simulation. Thus, the model obtained enables an energy storage system ESS to be quickly modelled without actually impacting the accuracy of the simulations enabling said system to be modelled.

In one embodiment, each value of the table SOCV_TC of the state of charge time variation $$\frac{dSOC}{dt}$$

of the system is obtained using a simulation performed for a given state of charge SOC(j) chosen as an initial state of charge $SOC_{ini}$ and a given power setpoint $P_{ac\_sp}(i)$ which belongs to a first sub-set of the plurality of simulations, said simulation being performed over a duration $t_{ESS}$. This simulation will enable a state of charge time variation $$\frac{dSOC}{dt}(i, j)$$

to be associated with each power setpoint $P_{ac\_sp}(i)$ and with each state of charge SOC(j). In one embodiment, the time step $\Delta t$ used for the simulations using the complex model is chosen such that $10^2 \Delta t < t_{ESS}$, preferably $10^3 \Delta t < t_{ESS}$.

Figure 4A:
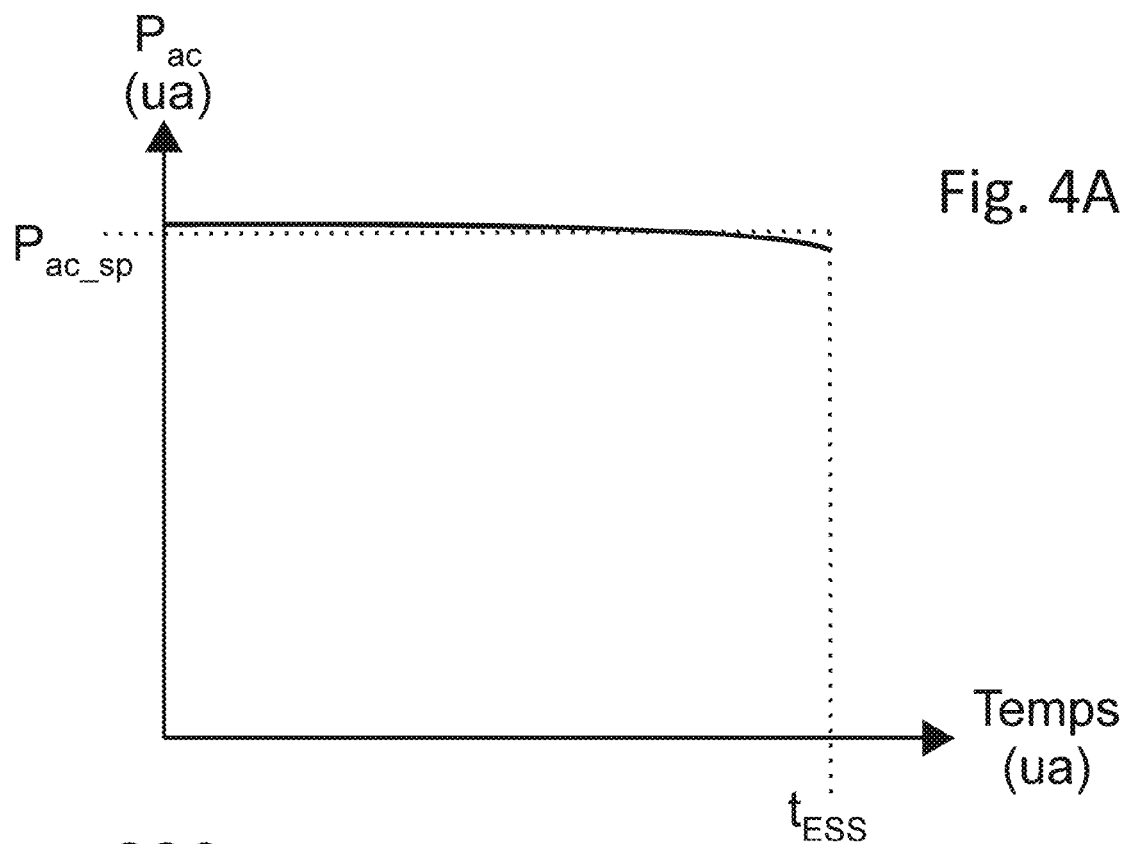
FIGS. 4A and 4B show a simulation involved in a method according to a first aspect of the invention.
Figure 4B:
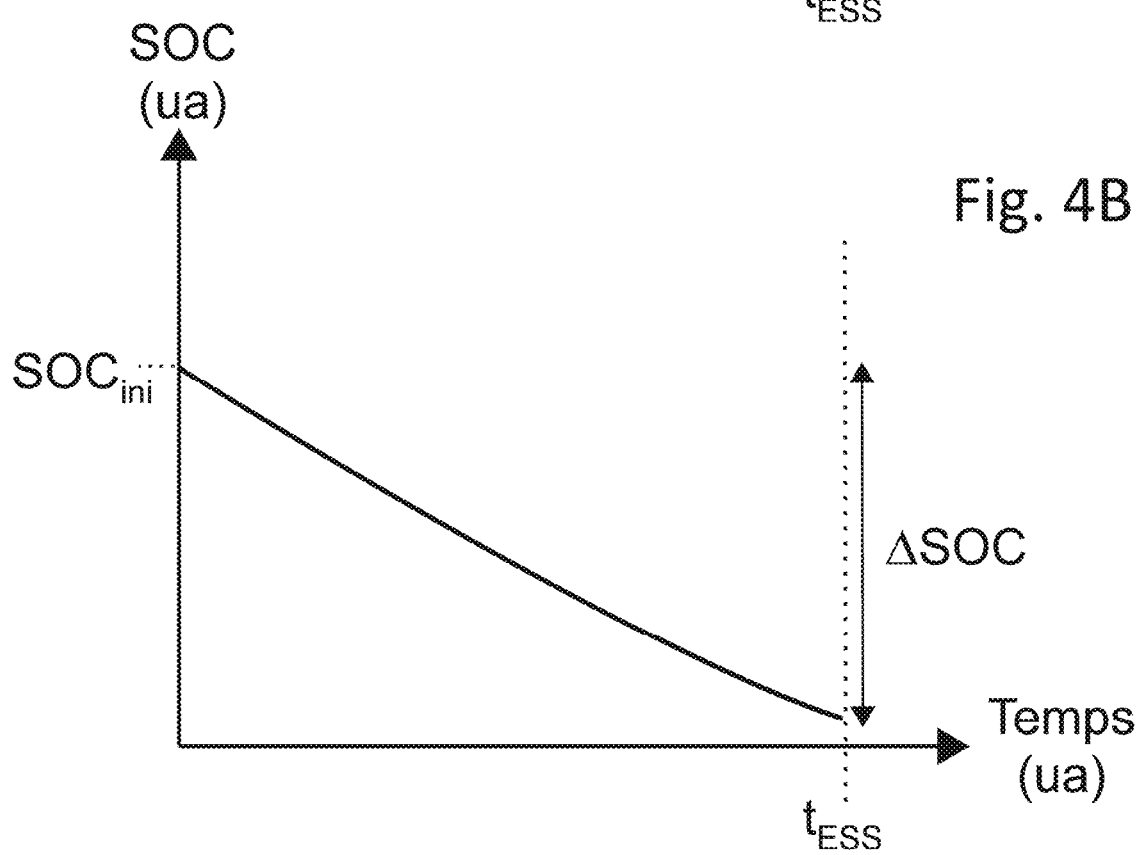
Figure 5A:
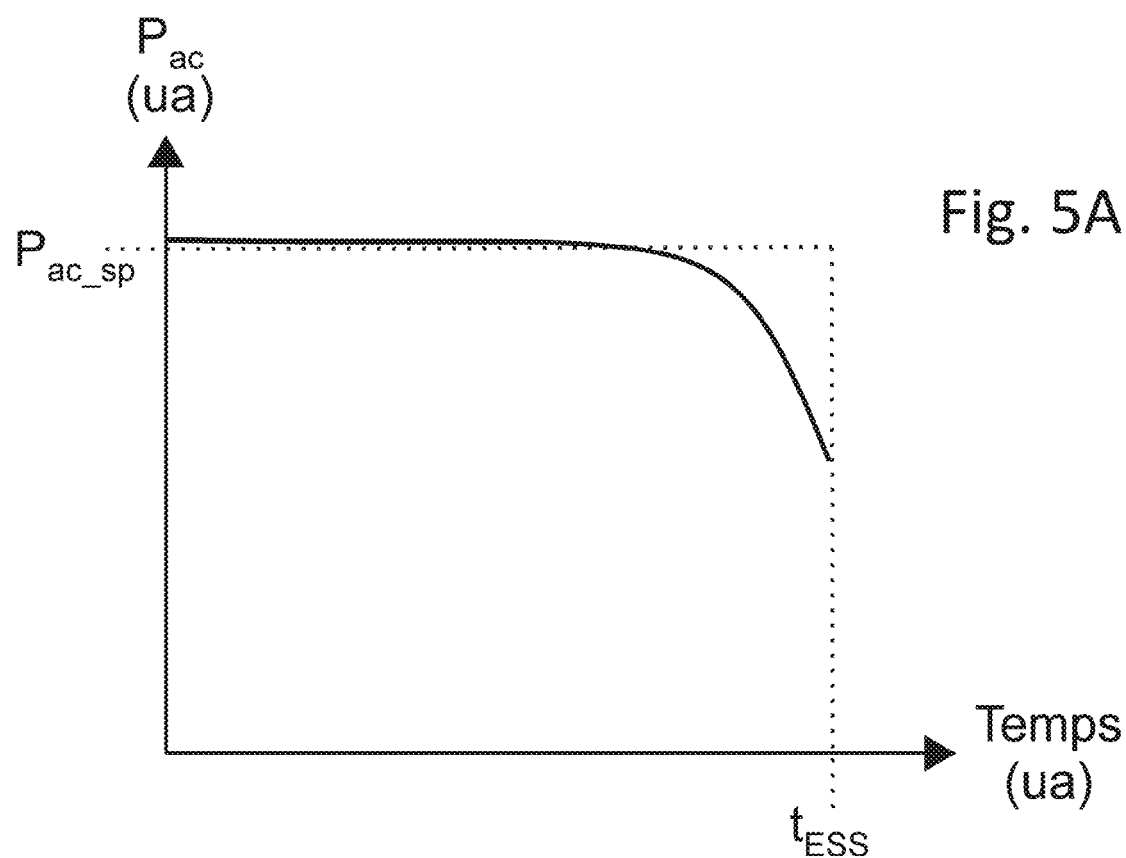
FIGS. 5A and 5B show a simulation involved in a method according to a first aspect of the invention.

FIGS. 4A-4B and 5A-5B illustrate two simulations of the first sub-set of the plurality of simulations performed for two different states of charge SOC and for a same simulation time $t_{ESS}$. FIGS. 4A and 5A reproduce the power $P_{ac}$ output from the energy management system as a function of time and FIGS. 4B and 5B reproduce the state of charge SOC of the energy management system as a function of time.

The simulation illustrated in FIGS. 4A and 4B describes a simulation in which the power $P_{ac}$ output from the energy storage system over the entire duration $t_{ESS}$ of the simulation is equal to the power setpoint $P_{ac\_sp}$. By equal, it is meant that the power $P_{ac}$ output from the system ESS is equal to the power setpoint $P_{ac\_sp}$ within 5%, or even within 2%, preferably within 1%. During this simulation, the state of charge SOC constantly decreases such that it is easy, from this simulation, to extract a value of the state of charge time variation $$\frac{dSOC}{dt}.$$

Figure 5B:
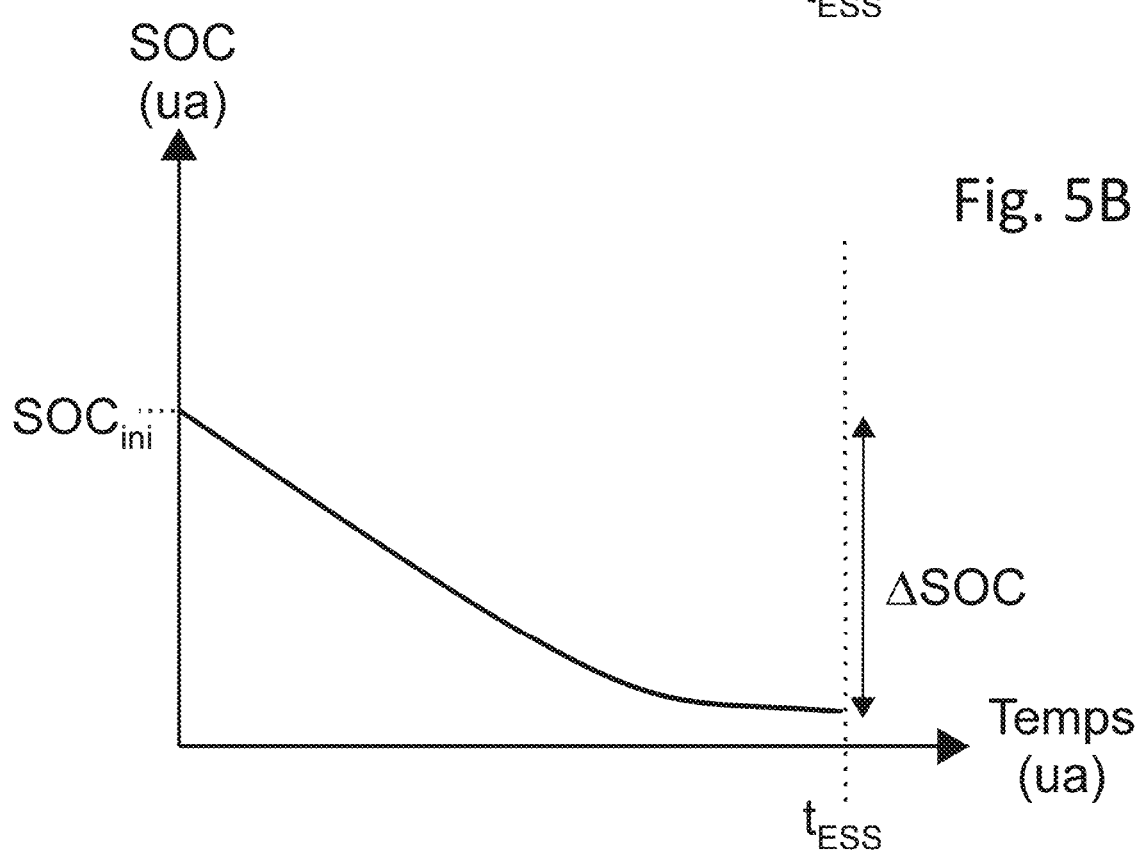

FIGS. 5A and 5B describe in turn a simulation in which the power $P_{ac}$ output from the energy storage system over the entire duration $t_{ESS}$ of the simulation is not constant, but varies during the simulation. This variation can for example be explained by the fact that the storage device DS of the energy storage system ESS is nearly fully charged (or discharged). During this simulation, the state of charge time variation $$\frac{dSOC}{dt}$$

of the storage system ESS is no longer constant, the state of charge SOC tending to form a plateau at the end of the simulation for reasons just discussed. In this case, it can be more difficult to assign a value properly representing the state of charge time variation $$\frac{dSOC}{dt}$$

of the energy storage system associated with the power setpoint $P_{ac\_sp}$ for a given state of charge SOC.

In order to take both cases into account, in a so-called "with interpolation" embodiment, the method according to a first aspect of the invention provides that each value of the table of correspondence SOCV_TC is:
- equal to the value of the state of charge variation $\Delta SOC$ obtained during said simulation over the time $t_{ESS}$ if the mean power $\langle P_{ac} \rangle$ during said simulation is equal to the power setpoint $P_{ac\_sp}$ (situation illustrated in FIGS. 2A and 2B);
- otherwise, (situation illustrated in FIGS. 3A and 3B), equal to:

$$interp\left\{[P_{ac\_sp}(i-1), \langle P_{ac}(i,j)\rangle], \left[\frac{dSOC(i-1,j)}{dt}, \frac{\Delta SOC(i,j)}{t_{ESS}}\right], P_{ac\_sp}(i)\right\}$$

with:

$$\frac{dSOC(i-1,j)}{dt},$$

the charge time variation obtained during the simulation or calculated corresponding to the state of charge SOC(j) and to a power setpoint $P_{ac\_sp}(i-1)$;

$\Delta SOC(i,j)$, the charge variation obtained during the simulation corresponding to the state of charge SOC(j) and to a power setpoint $P_{ac\_sp}(i)$;

$\langle P_{ac}(i,j)\rangle$, the mean value of the power $P_{ac}$ during the simulation corresponding to the state of charge SOC(j) and to a power setpoint $P_{ac\_sp}(i)$;

interp $\{[x_0, x_1], [y_0, y_1], x\}$ is the function which determines the y value corresponding to the x value by interpolation from the $x_0$, $x_1$, $y_0$ and $y_1$ values.

In other words, an interpolation is made using previously performed simulations. In order to make this interpolation, it is for example contemplatable to make, from the simulations of the first sub-set, a first table in which the columns represent different states of charge SOC, the rows represent different power setpoints $P_{ac\_sp}$ and the boxes of which contain the mean power $\langle P_{ac}\rangle$ during said simulation (cf. table 1) and a second table in which the columns represent different states of charge SOC, the rows represent different power setpoints $P_{ac\_sp}$ and the boxes of which contain the state of charge total variation $\Delta SOC$ during the simulation (cf. table 2). More particularly, for each state of charge SOC, a simulation is performed for a zero power setpoint $P_{ac\_sp}$ and then next simulations are performed for increasing power setpoints $P_{ac\_sp}$. Thus, when a power $P_{ac\_sp}$ which cannot be maintained during the simulation and which thus requires an interpolation is reached, the state of charge time variation $$\frac{dSOC(i-1,j)}{dt}$$

obtained during the previous simulation can be used for said interpolation. It is the same procedure for negative values of the power setpoint $P_{ac\_sp}$. In other words, if it is desired to calculate the state of charge time variation table $$\frac{dSOC}{dt}$$

for power setpoints $P_{ac\_sp}$ ranging from −Ps to Ps, the simulations are made beginning with a zero power setpoint $P_{ac\_sp}$ which is increased between each simulation up to a power setpoint value equal to Ps. Then, the simulations are then performed by beginning with a zero power setpoint $P_{ac\_sp}$ which is decreased between each simulation up down to a power setpoint value equal to −Ps.

In an alternative embodiment called "without interpolation", each value of the correspondence table SOCV_TC is equal to $$\frac{\Delta SOC(i, j)}{t_{ESS}},$$

with $\Delta SOC(i,j)$ the charge variation obtained during the simulation corresponding to the state of charge $SOC(j)$ and a power setpoint $P_{ac\_sp}(i)$. Indeed, the inventors have revealed that this approximation may surprisingly enable very good results to be obtained for a lesser cost in terms of computational power (this aspect of the invention will be illustrated thereafter).

TABLE 1

| | SOC(0) | ... | SOC(j − 1) | SOC(j) | SOC(j + 1) | ... | SOC(k') |
|---|---|---|---|---|---|---|---|
| $P_{ac\_sp}$(k) | <$P_{ac}$>(k, 0) | | <$P_{ac}$>(k, j − 1) | <$P_{ac}$>(k, j) | <$P_{ac}$>(k, j + 1) | | <$P_{ac}$>(k, k') |
| ... | | | | | | | |
| $P_{ac\_sp}$(i + 1) | <$P_{ac}$>(i + 1, 0) | | <$P_{ac}$>(i + 1, j − 1) | <$P_{ac}$>(i + 1, j) | <$P_{ac}$>(i + 1, j + 1) | | <$P_{ac}$>(i + 1, k') |
| $P_{ac\_sp}$(i) | <$P_{ac}$>(i, 0) | | <$P_{ac}$>(i, j − 1) | <$P_{ac}$>(i, j) | <$P_{ac}$>(i, j + 1) | | <$P_{ac}$>(i, k') |
| $P_{ac\_sp}$(i − 1) | <$P_{ac}$>(i − 1, 0) | | <$P_{ac}$>(i − 1, j − 1) | <$P_{ac}$>(i − 1, j) | <$P_{ac}$>(i − 1, j + 1) | | <$P_{ac}$>(i − 1, k') |
| ... | | | | | | | |
| $P_{ac\_sp}$(0) | <$P_{ac}$>(0, 0) | | <$P_{ac}$>(0, j − 1) | <$P_{ac}$>(0, j) | <$P_{ac}$>(0, j + 1) | | <$P_{ac}$>(0, k') |

TABLE 2

| | SOC(0) | ... | SOC(j − 1) | SOC(j) | SOC(j + 1) | ... | SOC(k') |
|---|---|---|---|---|---|---|---|
| $P_{ac\_sp}$(k) | $\Delta$SOC(k, 0) | | $\Delta$SOC(k, j − 1) | $\Delta$SOC(k, j) | $\Delta$SOC(k, j + 1) | | $\Delta$SOC(k, k') |
| ... | | | | | | | |
| $P_{ac\_sp}$(i + 1) | $\Delta$SOC(i + 1, 0) | | $\Delta$SOC(i + 1, j − 1) | $\Delta$SOC(i + 1, j) | $\Delta$SOC(i + 1, j + 1) | | $\Delta$SOC(i + 1, k') |
| $P_{ac\_sp}$(i) | $\Delta$SOC(i, 0) | | $\Delta$SOC(i, j − 1) | $\Delta$SOC(i, j) | $\Delta$SOC(i, j + 1) | | $\Delta$SOC(i, k') |
| $P_{ac\_sp}$(i − 1) | $\Delta$SOC(i − 1, 0) | | $\Delta$SOC(i − 1, j − 1) | $\Delta$SOC(i − 1, j) | $\Delta$SOC(i − 1, j + 1) | | $\Delta$SOC(i − 1, k') |
| ... | | | | | | | |
| $P_{ac\_sp}$(0) | $\Delta$SOC(0, 0) | | $\Delta$SOC(0, j − 1) | $\Delta$SOC(0, j) | $\Delta$SOC(0, j + 1) | | $\Delta$SOC(0, k') |

Figure 6A:
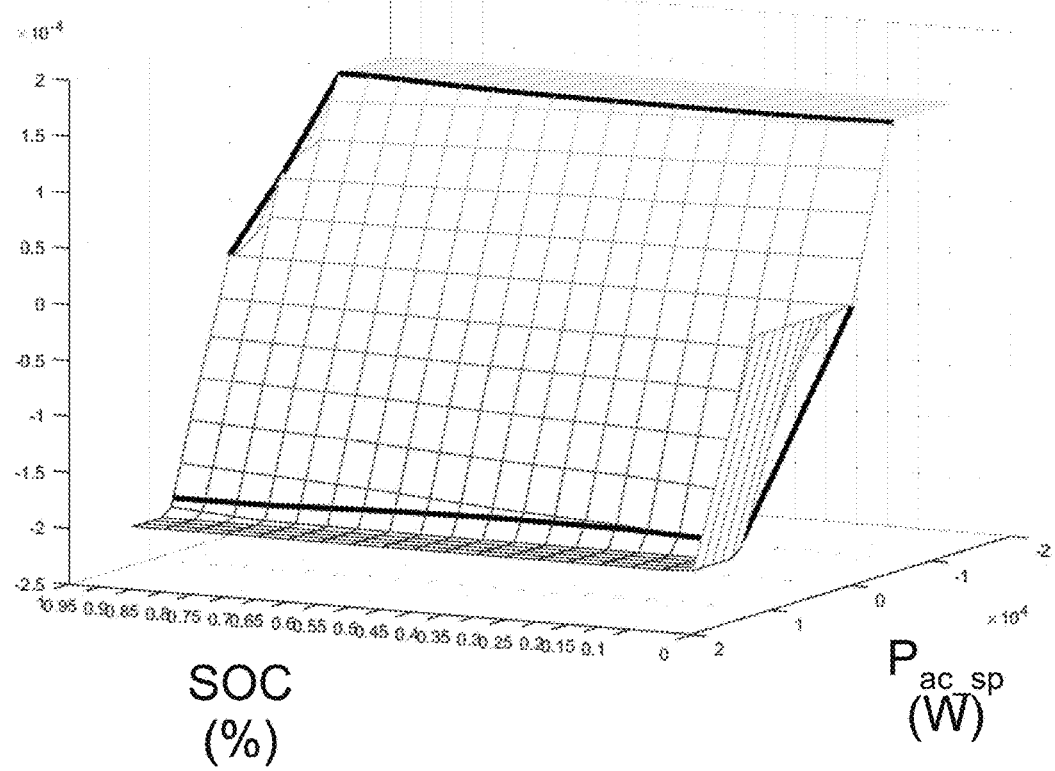
FIGS. 6A and 6B show a 3D illustration of a state of charge time variation table of the system according to a first aspect of the invention.
Figure 6B:
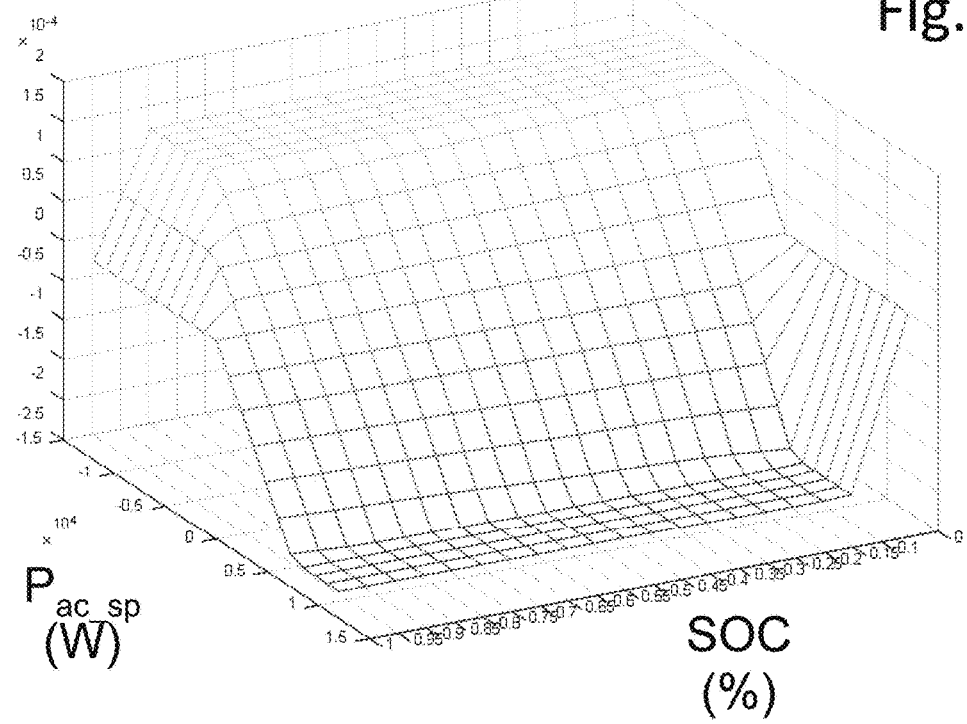

FIGS. 6A and 6B illustrate in 3D the state of charge variation table SOCV_TC of the system (along axis z) as a function of the power setpoint $P_{ac\_sp}$ and the state of charge SOC. In both figures, two zones separated by two black lines which correspond to the boundaries imposed by minimum power and maximum power clearly appear, these limit values varying as function of the state of charge SOC as will be described later. This representation makes it possible to reveal an important aspect relating to the state of charge variation table SOCV_TC of the system: it enables a value to be assigned to the state of charge time variation $$\frac{dSOC}{dt}$$

for power setpoints $P_{ac\_sp}$ higher (in absolute value) than the limit values that are the maximum power and minimum power for a given state of charge. This is only made possible by resorting to the interpolation as just described or even by using two other so-called "without interpolation" or "with the previous value" alternatives which will now be described. It is to be noted that the purpose of this interpolation is not to fill in the table for values which in any case will not be used because they are unreachable, but to make the points at the limit of the previously described zones more accurate.

In an alternative embodiment called "with the previous value", each value of the state of charge variation table SOCV_TC of the system is equal to:

the value of the state of charge variation $\Delta$SOC obtained during said simulation over the time $t_{ESS}$ if the mean power <$P_{ac}$> during said simulation is equal to the power setpoint $P_{ac\_sp}$, otherwise, $$\frac{dSOC(m, j)}{dt}$$

where $$\frac{dSOC(m, j)}{dt}$$

is the charge variation obtained during the simulation corresponding to the state of charge SOC(j) and the power setpoint $P_{ac\_sp}(m)$, $P_{ac\_sp}(m)$ being the power setpoint closest to the power setpoint $P_{ac\_sp}(i)$ for which the mean power <$P_{ac}$> during said simulation is equal to the power setpoint $P_{ac\_sp}(m)$.

Figure 9:
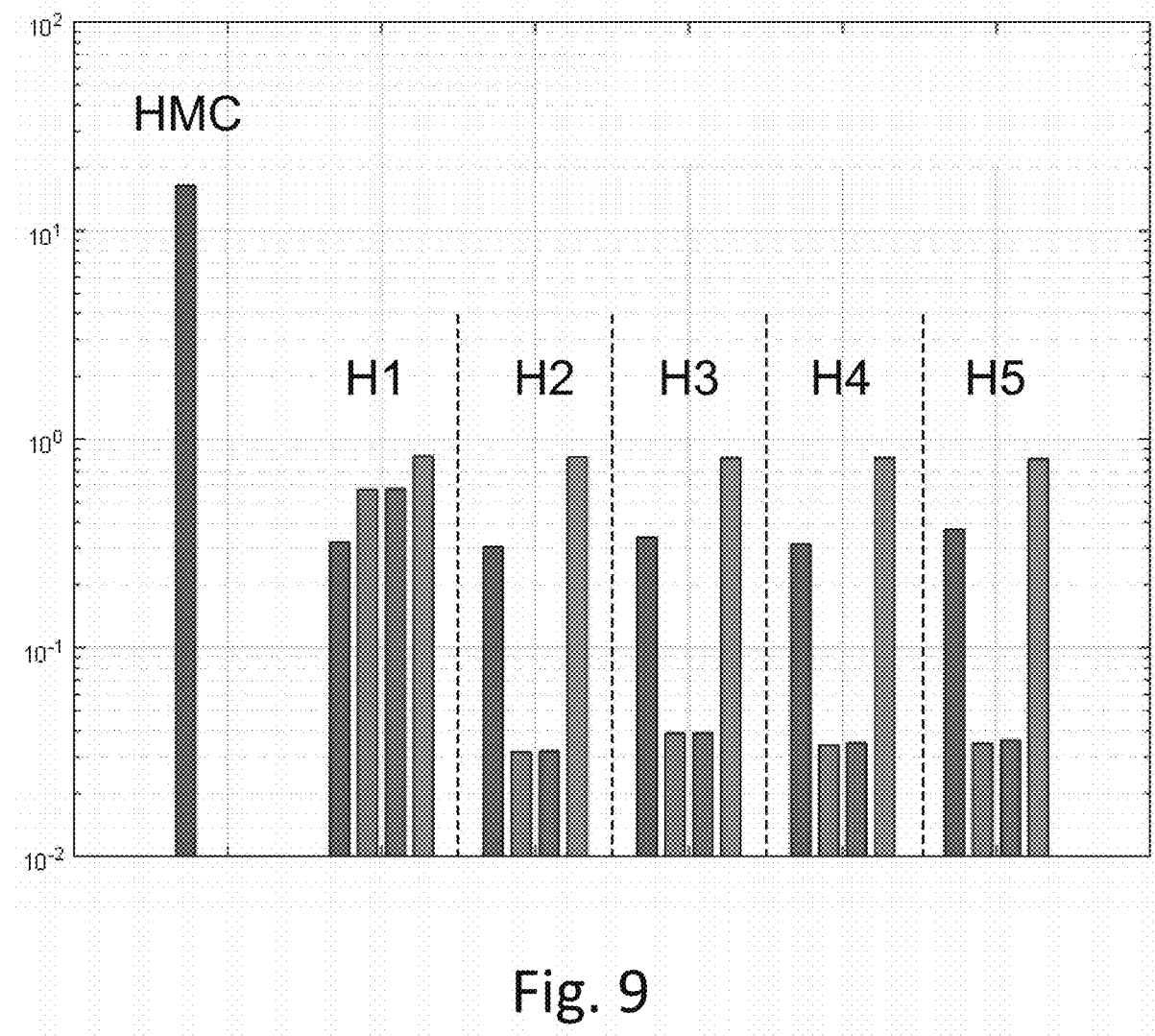
FIG. 9 shows a graph illustrating the time and accuracy performance of a model obtained using a method according to a first aspect of the invention.

Thus, when the power setpoint $P_{ac\_sp}$ cannot be maintained during the simulation, the results of a previous simulation are used in order to assign a value to the state of charge time variation $$\frac{dSOC}{dt}$$

of the energy storage system ESS. This aspect enables calculations necessary to obtain the table SOCV_TC of the state of charge time variation $$\frac{dSOC}{dt}$$

of the system to be limited with however certain limitations discussed thereafter and illustrated in FIG. 9.

Figure 7A:
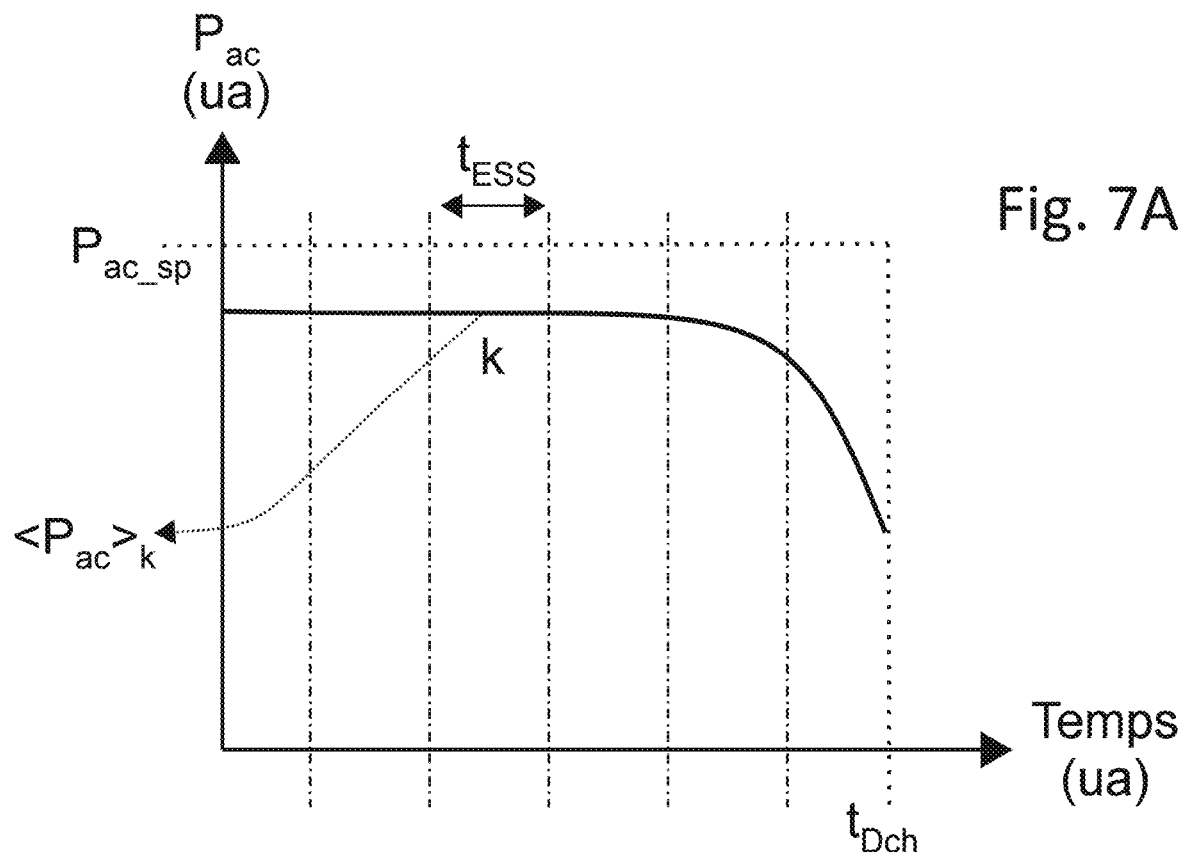
FIGS. 7A and 7B show a simulation involved in a method according to a first aspect of the invention.
Figure 7B:
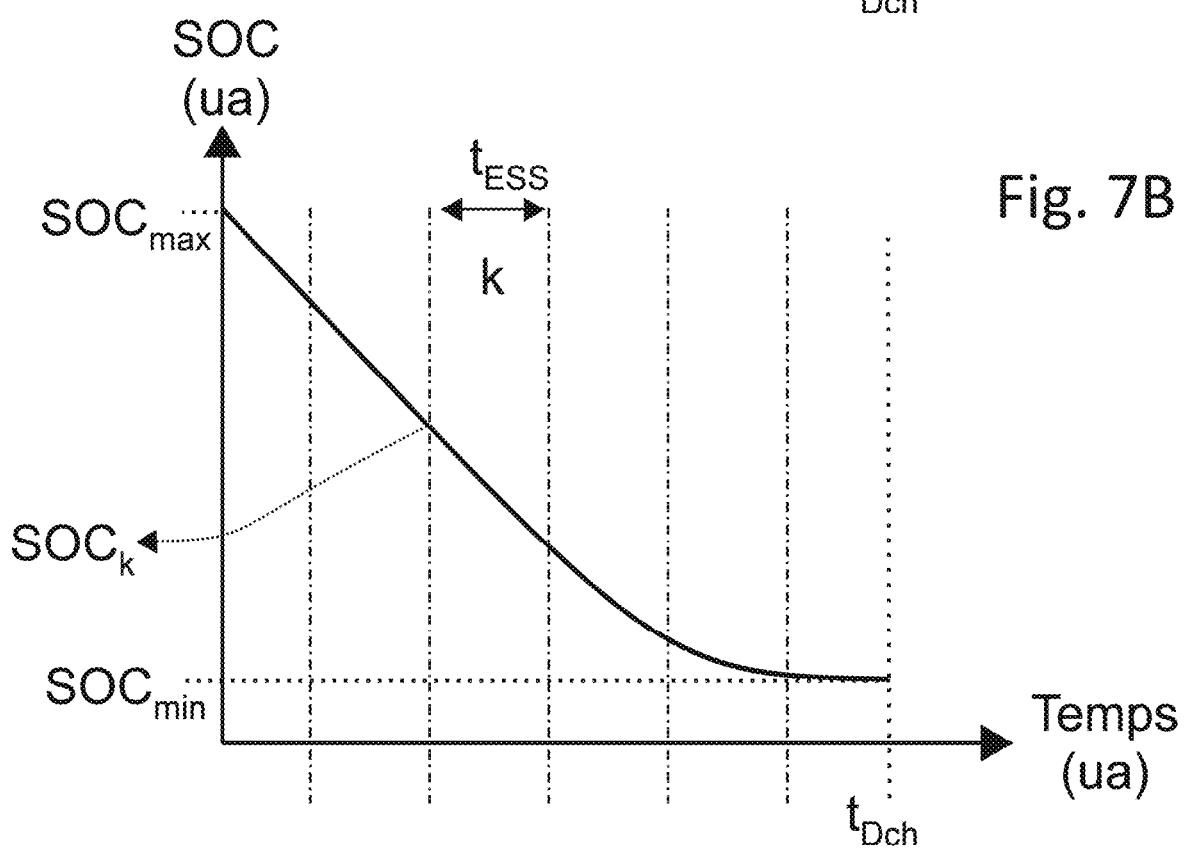

In one embodiment illustrated in FIGS. 7A and 7B, in order to obtain the maximum power table PAC_MAX_TC as a function of the state of charge SOC, the plurality of simulations includes a simulation performed with an initial state of charge $SOC_{ini}$ equal to the maximum state of charge $SOC_{max}$, a duration equal to the duration necessary for fully discharging the storage system $t_{Dch}$ (namely until the state of charge reaches the minimum state of charge $SOC_{min}$ value) and a positive infinite power setpoint $P_{ac\_sp}$. By a positive infinite power setpoint $P_{ac\_sp}$, it is meant a power setpoint $P_{ac\_sp}$ much higher than the power the system can provide. Thus, the mean power $<P_{ac}>_k$ on a given interval can be considered as the maximum power for the state of charge $SOC_k$ corresponding to said interval. Moreover, the calculation of the maximum power table PAC_MAX_TC as a function of the state of charge SOC includes:

a step of determining periods with a duration $t_{ESS}$ within said simulation, each period being identified by means of a positive integer k;

for each of these periods, a step of determining the state of charge $SOC_k$ at the beginning of the period k and the mean power $<P_{ac}>_k$ during the period k.

The plurality of couples ($SOC_k$, $<P_{ac}>_k$) thus makes up the maximum power table PAC_MAX_TC as a function of the state of charge SOC such that for each given state of charge $SOC_k$, it is possible to assign a maximum power (equal to $<P_{ac}>_k$).

Figure 8A:
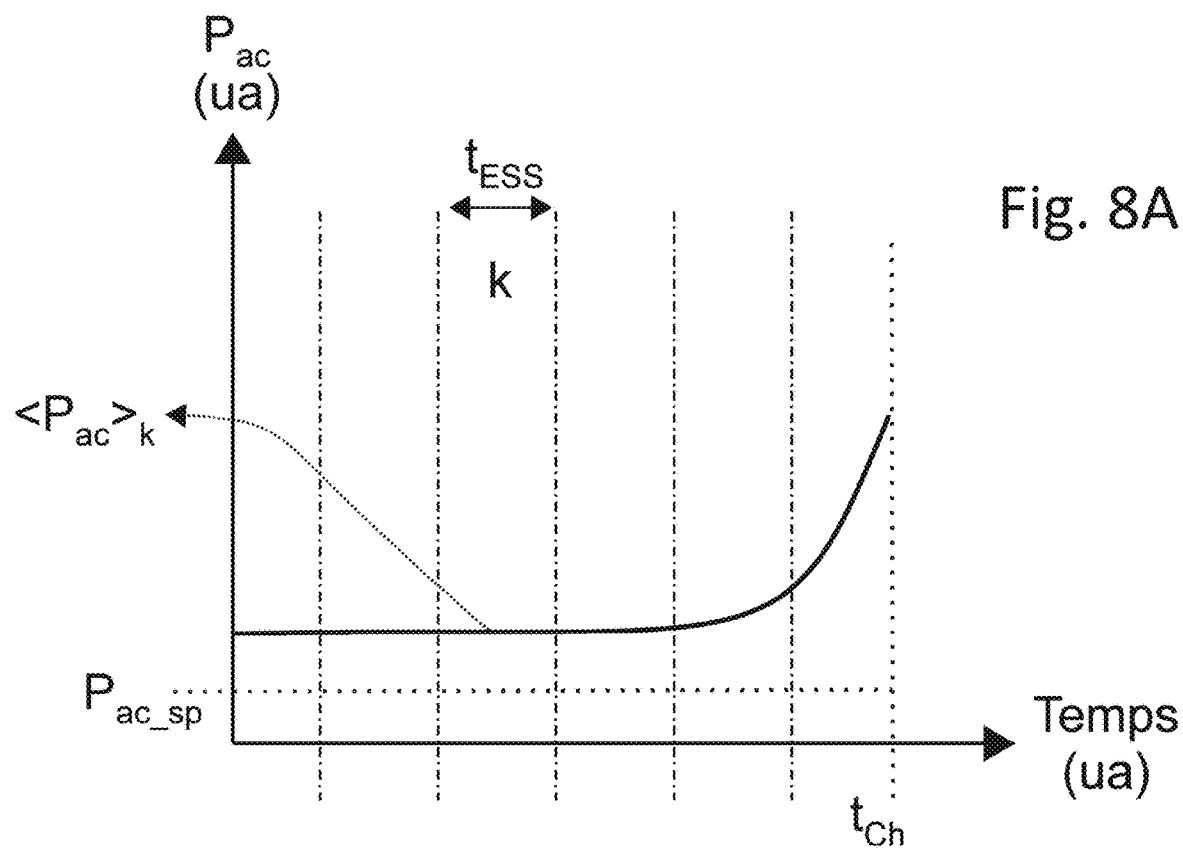
FIGS. 8A and 8B show a simulation involved in a method according to a first aspect of the invention.
Figure 8B:
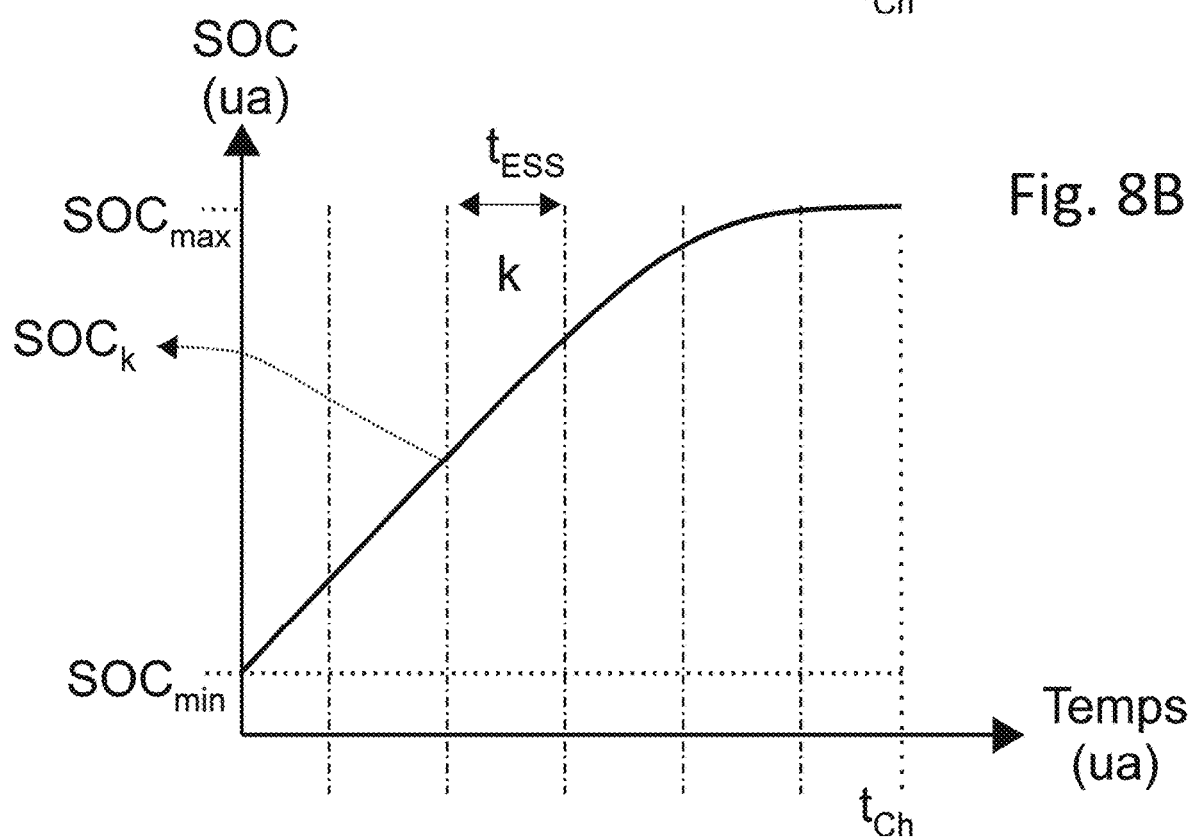

In one embodiment illustrated in FIGS. 8A and 8B, in order to obtain the minimum power table PAC_MIN_TC as a function of the state of charge SOC, the plurality of simulations includes a simulation performed with an initial state of charge $SOC_{ini}$ equal to the minimum state of charge $SOC_{min}$, a duration equal to the duration necessary for fully charging the storage system $t_{Ch}$ (that is until the state of charge reaches the maximum state of charge $SOC_{max}$ value) and a negative infinite power setpoint $P_{ac\_sp}$. By a negative infinite power setpoint $P_{ac\_sp}$, it is meant a power setpoint $P_{ac\_sp}$ much higher than the power the system can accept upon charging. Thus, the mean power $<P_{ac}>_k$ on a given interval can be considered as the minimum power for the state of charge $SOC_{k'}$ corresponding to said interval. Moreover, the calculation of the minimum power table PAC_MIN_TC as a function of the state of charge SOC includes:

a step of determining periods with a duration $t_{ESS}$ within said simulation, each period being identified by means of a positive integer k';

for each of these periods, a step of determining the state of charge $SOC_{k'}$ at the beginning of the period k' and the mean power $<P_{ac}>_{k'}$ during the period k.

The plurality of couples ($SOC_{k'}$, $<P_{ac}>_{k'}$) thus makes up the minimum power table PAC_MIN_TC as a function of the state of charge SOC such that for each given state of charge $SOC_{k'}$, it is possible to assign a minimum power (equal to $<P_{ac}>_{k'}$).

In one embodiment, each simulation of a first sub-set of simulations is performed for a given state of charge SOC(j) and a given power setpoint $P_{ac\_sp}(i)$ and each state of charge SOC(j) is separate from the previous one SOC(j−1) and/or the next one SOC(j+1) by an adaptive state of charge step and/or each power setpoint $P_{ac\_sp}(i)$ is separated from the previous one $P_{ac\_sp}(i−1)$ and/or from the next power setpoint $P_{ac\_sp}(i+1)$ by an adaptive power setpoint step.

In one embodiment, the simulation step is repeated for a plurality of durations $t_{ESS}$. Thus, a correspondence table is made up per simulation duration $t_{ESS}$, the correspondence table used by the driving system being chosen as a function of the necessary accuracy.

FIG. 9 makes it possible to point out advantages of the model obtained using a method according to a first aspect of the present invention. The first histogram HMC corresponds to the simulation time when the simulation is performed using a complex system with a time step $\Delta t$ equal to 1 second. The graph also comprises five groups H1, H2, H3, H4, H5 of four histograms, each group corresponding to a simulation identical to that performed with the complex model, but performed using a simplified model obtained by a method according to a first aspect of the invention and for a given simulation time $t_{ESS}$. In other words, each group corresponds to a simulation performed with a simplified model and with a simulation time step equal to the simulation time $t_{ESS}$ used during the method for determining the parameters of said simplified model.

In each group, the first histogram relates to the simulation time and the second, third and fourth histograms relate to:

for the second histogram, the RMSE error between the simulation using the complex model and a simulation using a model obtained using a method according to a first aspect of the invention in the so-called "with interpolation" embodiment, for the third histogram, the RMSE error between the simulation using the complex model and a simulation using a model obtained using a method according to a first aspect of the invention in the so-called "without interpolation" embodiment;

for the fourth histogram, the RMSE error between the simulation using the complex model and a simulation using a model obtained using a method according to a first aspect of the invention in the so-called "with the previous value" embodiment.

The group H1 relates to a case where the time $t_{ESS}$ is equal to 926 seconds. In this case, the accuracy obtained with the "with interpolation" and "without interpolation" methods is substantially identical whereas the accuracy obtained with the "with the previous value" method is lower. Moreover, the simulation time using a model obtained by a method according to the invention is much lower than the simulation time using a complex model according to the state of prior art.

The group H2 relates to a case where the time $t_{ESS}$ is equal to 463 seconds. It is noticed that the accuracy of the "with interpolation" and "without interpolation" methods is significantly improved whereas the accuracy with the "with the previous value" method has clearly deteriorated.

The groups H3 relating to a case where the time $t_{ESS}$ is equal to 93 seconds, H4 relating to a case where the time $t_{ESS}$ is equal to 47 seconds and H5 relating to a case where the time $t_{ESS}$ is equal to 10 seconds only confirm tendencies observed in both previous groups, namely that the error decreases when the time $t_{ESS}$ decreases and the "with interpolation" and "without interpolation" methods enable similar results to be obtained whereas the "with the previous value" method is still less efficient.

In order to illustrate the course of the method according to a first aspect of the invention, a complex model comprising a model relating to a conversion device as well as a model relating to a storage device will be set forth thereafter. It is important to note that the method according to a first aspect of the invention does not depend on the complex model type used and the complex model that follows is given by way of purely illustrating purposes. It will reveal the advantage in terms of simplification of modelling (and thus of driving) an energy storage system which is provided by the model obtained using a method according to a first aspect of the invention.

Thereafter, input values are initialised during the first iteration and then updated during next iterations. Output values are in turn calculated as a function of input values as well as parameters of the model. The parameters of the model are generally provided by the manufacturer of the conversion device or storage device, but can also be determined from tests and experimental measurements.

Additionally, the value of the quantity X will be noted $X^t$ at iteration t. Moreover, the function related to a correspondence table Y will be noted $f_Y$. It is also assumed that when a value is not directly available in a correspondence table, the latter is obtained by interpolation, for example linear interpolation, from values available in said correspondence table (it is a standard method for using a correspondence table).

The use of the model relating to a conversion device will now be detailed. Inputs, parameters and outputs relating to said model are gradually introduced. The model first enables the phase-shift angle $\phi$ between the active part $P_{ac\_sp}$ and the reactive part $Q_{ac\_sp}$ of the power setpoint to be calculated.

The active part $P_{ac\_sp}$ and the reactive part $Q_{ac\_sp}$ of the power setpoint are the model inputs. The phase-shift angle is simply obtained using the following relationship:

$$\Phi = \tan^{-1}\left(\frac{Q_{ac\_sp}}{P_{ac\_sp}}\right)$$

However, in order to simplify the statement that will follow, the reactive power setpoint $Q_{ac\_sp}$ is considered as zero on the entire simulation and thus the phase-shift $\phi$ value does not depend on the iteration.

Once the phase-shift angle is known, the model enables the apparent maximum power $S_{max}$_LUT to be calculated using a correspondence table $S_{max}$_LUT providing the apparent maximum power $S_{max}$ as a function of the phase-shift angle $\phi$ such that:

$$S_{max}=f_{S_{max}LUT}(\Phi)$$

The model then enables the maximum active $P_{ac\_sat}$ and reactive $Q_{ac\_stat}$ powers that the conversion system can absorb to be calculated. This calculation is performed using a saturation function $f_{sat}$ which models the saturation applied to the active and reactive power setpoints. In other words:

$$[P_{ac\_sat},Q_{ac\_sat}]=f_{sat}(S_{max},\Phi,P_{ac\_sp},Q_{ac\_sp})$$

As previously mentioned, the reactive power setpoint $Q_{ac\_sp}$ is considered as zero on the entire simulation and thus, the same is true for $Q_{ac\_sat}$. The previous relationship can thus be rewritten the following way:

$$P_{ac\_sat}=\min(S_{max},P_{ac\_sp})$$

This condition makes it possible to ensure that even if the power setpoint $P_{ac\_sp}$ is higher than the maximum power $S_{max}$ that can be provided by the conversion device, the actually provided power is limited by the maximum power the conversion device can provide.

The model then enables the D.C. power $P_{dc}$ corresponding to the power setpoint $P_{ac\_sp}$ to be calculated using the correspondence table $P_{ac}$_LUT giving the A.C. power $P_{ac}$ as a function of the D.C. power $P_{dc}$, the reactive power $Q_{ac}$, of the voltage $U_{dc}$ received as an input and the voltage $U_{ac}$; in other words:

$$P_{ac}=f_{P_{ac}\_LUT}(P_{dc},Q_{ac},U_{dc},U_{ac})$$

The previous relationship should then be used in order to determine $P_{dc}$. For this, the $P_{ac}$ and $Q_{ac}$ values are chosen such that $P_{ac}=P_{ac\_sp}$ and $Q_{ac}=Q_{ac\_sp}$, the voltage $U_{ac}$ being known and equal to the nominal voltage of the conversion system $U_{nom}$ provided as an input, and the Newton-Raphson method is used to solve the following minimisation:

$$\min(|P_{ac\_sp}-f_{P_{ac}\_LUT}(P^*_{dc},Q_{ac\_sp},U_{dc},U_{ac})|$$

where $P^*_{dc}$ is the initial value taken equal to $P_{ac\_sp}$ from which the minimisation is performed, said minimisation enabling the D.C. power $P_{dc}$ to be obtained.

The model then enables the current setpoint to be sent from the battery $I_{dc\_sp}$ to the model of the storage device after the same has been calculated using the following relationship:

$$I_{dc\_sp} = \frac{P_{dc}}{U_{dc}}$$

The model additionally enables the active power $P_{ac}$ to be calculated using the correspondence table $P_{ac}$_LUT introduced beforehand such that:

$$P_{ac}=f_{P_{ac}\_LUT}(P_{dc},Q_{ac},U_{dc},U_{ac})$$

As previously mentioned, the reactive power setpoint $Q_{ac\_sp}$ is considered as zero on the entire simulation and thus, the same is true for $Q_{ac}$. It is also important to notice that the output voltage $U_{ac}$ is imposed by the system so as not to have a fluctuating voltage and its value is given by the nominal A.C voltage of the conversion system $U_{nom}$, the latter being a parameter of the model.

In this same exemplary embodiment, a model relating to a storage device taking as inputs the current setpoint $I_{dc\_sp}$ (provided by the conversion device) and the temperature is considered. This model is coupled to the model previously detailed to make up the complex model of the energy storage system ESS. Thereafter, it is considered that the temperature of the storage device is provided by a model external to the complex model and input to the latter. Moreover, it is hypothesised that the temperature has no influence on the behaviour of the battery or that the temperature is maintained by an external device. In this case, the input temperature remains constant and equal to the initial temperature. It is however only an exemplary embodiment and it is also contemplatable to couple the complex model with a thermal model when the previous hypotheses are no longer fulfilled.

The model first enables the power lost in the auxiliary system to be calculated using a correspondence table $P_{dc\_aux\_LUT}$ providing the lost power $P_{dc\_aux}$ in the auxiliary system of the storage device as a function of the current setpoint $I_{dc\_sp}$ received by the storage device such that:

$$P_{dc\_aux}{}^t = f_{P_{dc\_aux}LUT}(I_{dc\_sp}{}^t)$$

By considering that the elements of the auxiliary system (fans for example) operate at their optimum voltage known to the user and equal to $U_{dc\_aux}$, the current consumed by said auxiliary system, the model enables the auxiliary current $I_{dc\_aux}$ to be obtained using the following relationship:

$$I_{dc\_aux}^t = \frac{P_{dc\_aux}^t}{U_{dc\_aux}^t}$$

Once the current is consumed by said known auxiliary system $I_{dc\_aux}$, the model enables the influence thereof on the current setpoint $I_{dc\_sp}$ to be evaluated in order to obtain a modified current setpoint $I_{dc'}$ using the following relationship:

$$I'_{dc}{}^t = I_{dc\_sp}{}^t - I_{dc\_aux}{}^t$$

In other words, when the storage device is charged with a current $I_{dc\_sp}$, the current actually used for said charging is equal to $I_{dc'}$. In the same way, when the storage device is discharged by a current $I_{dc\_sp}$, the current the storage system can actually provide is equal to $I_{dc'}$.

The model also makes it possible to take into consideration the fact that the current $I_{dc'}$ is limited by a maximum current $I_{ChMax}$ upon charging the storage system and a maximum current $I_{DchMax}$ upon discharging said system. For this, the maximum current $I_{ChMax}$ upon charging is determined using a correspondence table $I_{ChMax\_}$LUT providing the maximum current $I_{ChMax}$ upon charging as a function of the state of charge SOC, the state of health SOH and the temperature T:

$$I_{ChMax}^{t+1} = f_{I_{ChMax\_LUT}}(SOC^t, SOH^t, T^t)$$

Likewise, the maximum current $I_{DchMax}$ upon discharging is obtained using the correspondence table $I_{DchMax\_}$LUT providing the maximum current $I_{DchMax}$ upon discharging as a function of the state of charge SOC, the state of health SOH and the temperature T:

$$I_{DchMax}^{t+1} = f_{I_{DchMax\_LUT}}(SOC^t, SOH^t, T^t)$$

In other words, the current $I_{dc}$ can be determined using the following relationship:

$$I_{dc}^t = \begin{cases} I'^t_{dc} \text{ si } I^t_{ChMax} < I'^t_{dc} < I^t_{DchMax} \\ I^t_{ChMax} \text{ si } I^t_{ChMax} \geq I'^t_{dc} \\ I^t_{DchMax} \text{ si } I^t_{DchMax} \leq I'^t_{dc} \end{cases}$$

The model further enables the state of charge variation of the storage device to be calculated. This variation can be obtained using a correspondence table $SOC_{speed\_}$LUT providing the state of charge time variation as a function of the state of charge SOC, the state of health SOH, the current $I_{dc}$ and the temperature T such that:

$$\frac{dSOC^t}{dt} = f_{soc_{speed_{LUT}}}(I^t_{dc}, SOC^t, SOH^t, T^t)$$

Since the initial state of charge is known, the model is capable of calculating the states of charge corresponding to the following iterations using the following relationships:

$$SOC^{t+1} = SOC^t + \frac{dSOC^t}{dt} \times \Delta t$$

where $\Delta t$ is the time step between two successive iterations.

The model also enables the state of health of the storage means to be calculated. This state of health is assessed through an ageing which corresponds to a state of health variation. This ageing includes two components (which are negative):
- ageing due to time (called calendar ageing) $\Delta SOH^t_{calSpeed}$; and
- ageing due to cycles $\Delta SOH^t_{cycSpeed}$.

The model enables the ageing due to time $\Delta SOH^t_{calSpeed}$ to be determined using the correspondence table $\Delta SOH_{calSpeed\_}$LUT providing ageing as a function of the state of charge SOC, the state of health and the temperature such that:

$$\Delta SOH_{calSpeed}^{t+1} = f_{\Delta SOH_{calSpeedLUT}}(SOH^t, T^t, SOC^t)$$

Likewise, the model enables ageing due to cycling $\Delta SOH^t_{cycSpeed}$ to be determined using a correspondence table $\Delta SOH_{cycSpeed\_}$LUT providing ageing due to cycling as a function of the state of charge SOC, the state of health SOH, the current $I_{dc}$ and the temperature T such that:

$$\Delta SOH_{cycSpeed}^{t+1} = f_{\Delta SOH_{cycSpeedLUT}}(SOH^t, T^t, SOC^t, I_{dc}^t)$$

The state of health is then calculated using the following relationship:

$$\Delta SOH^t = \Delta SOH^t_{calSpeed} + \Delta SOH_{cycspeed}^t$$

The model then enables the resistance $R_{ch}$ of the system to be determined during charging using the correspondence table $R_{ch\_}$LUT providing the resistance $R_{ch}$ of the system during charging as a function of the current $I_{dc}$ upon charging, the state of charge SOC, the state of health SOH and the temperature T such that:

$$R_{Ch}^{t+1} = f_{R_{Ch\_LUT}}(SOH^t, T^t, SOC^t, I_{dc}^{t+1})$$

Likewise, the model enables the resistance $R_{Dch}$ of the system to be determined during discharging using a correspondence table $R_{Dch\_}$LUT providing the resistance $R_{Dch}$ of the system during discharging as a function of the current $I_{dc}$ upon discharging, the state of charge SOC, the state of health SOH and the temperature T such that:

$$R_{Dch}^{t+1} = f_{R_{Dch\_LUT}}(SOH^t, T^t, SOC^t, I_{dc}^{t+1})$$

Additionally, the model enables the open circuit voltage $OCV_{Ch}$ to be known upon charging using a correspondence table $OCV_{Ch\_}$LUT providing the open circuit voltage $OCV_{Ch}$ upon charging as a function of the state of charge SOC, the state of health SOH and the current $I_{dc}$ such that:

$$OCV_{Ch}^{t+1} = f_{OCV_{Ch\_LUT}}(SOH^t, T^t, SOC^t, SOC^t)$$

Likewise, the model enables the open circuit voltage $OCV_{Dch}$ to be known upon discharging using a correspondence table $OCV_{Dch\_}$LUT providing the open circuit voltage $OCV_{Dch}$ upon discharging as a function of the state of charge SOC, the state of health SOH and the current $I_{dc}$ such that:

$$OCV_{Dch}^{t+1} = f_{OCV_{Dch\_LUT}}(SOH^t, T^t, SOC^t, SOC^t)$$

Further, the model enables the D.C voltage $U_{dc}$ across the storage system to be determined using the Ohm's law by means of the following relationship:

$$U_{dc}^t = OCV_{Ch/Dch}^t - I_{dc}^t \times R_{Ch/Dch}^t$$

where $I_{dc}^t$ is negative upon charging and positive upon discharging. It is to be noted that when the value obtained for the D.C voltage $U_{dc}$ across the storage system exceeds the maximum voltage $U_{maxch}^t$, a maximum voltage overflow indicator $U_{max}\_limit\_status$ is updated. This maximum voltage can be calculated using the following relationship:

$$U_{ChMax}^t = OCV^t - I_{ChMax}^t \times R_{Ch}^t$$

Likewise, when the value obtained for the D.C voltage $U_{dc}$ across the storage system is lower than the minimum voltage $U_{DchMax}$, a minimum voltage overflow indicator $U_{min}\_limit\_status$ is updated. This discharge maximum voltage can be calculated using the following relationship:

$$U_{DchMax}^{t+1} = OCV^t - I_{DchMax}^t \times R_{Dch}^t$$

The model then enables the power provided by the battery $P_{dc}$ to be calculated using the following relationship:

$$P_{dc}^t = U_{dc}^t \times I_{dc}^t$$

Of course, this power value is bounded by the limit voltages and currents such that:

$$\begin{cases} P_{maxCh} = I_{maxCh} \times U_{maxCh} \\ P_{maxDch} = I_{maxDch} \times U_{maxDch} \end{cases}$$

As already mentioned, the model of conversion device is combined with the model of storage device in order to obtain a complex model likely to model an energy management device. Thus, the energy storage device can be simulated. However, as detailed above, the complex model comprises a large number of parameters and variables to calculate and is hardly usable for efficiently driving such a facility, especially as the driving time step of such a system is a few minutes, or even a few hours whereas the simulation time step in the case of a complex model should be in the order of one second or even lower than one second in order not to lose accuracy in the results obtained. With solutions of prior art and only having the above detailed complex model available, the user is thus facing two options, both unsatisfactory:
- either he/she chooses a simulation time step with the same order of magnitude as the driving time step in order to limit the necessary computational power, but the accuracy of the simulation (and thus driving) results will be unsatisfactory;
- either he/she maintains a low simulation time step to keep a good accuracy, but resources used to perform all the calculations are thereby much more important and may be not available.

Thus, no solution enabling the advantage of each of these options to be kept is available, and this absence is overcome by the present invention. The latter provides for this, as previously described, a plurality of simulations that is performed using a complex model just described so as to obtain three correspondence tables:
- a state of charge variation table (SOCV-TC) of the system as a function of the power setpoint $P_{ac\_sp}$ and the state of charge SOC;
- a maximum power table (PAC_MAX_TC) as a function of the state of charge SOC;
- a minimum power table (PAC_MIN_TC) as a function of the state of charge SOC.

Using the model thus obtained and from an input power setpoint $P_{ac\_sp}$, and an input state of charge $SOC_p$ (herein noted $SOC^t$ because its value is given by the iteration t), it is possible to calculate the minimum and maximum powers output from the system using the maximum power table PAC_MAX_TC provided as a function of the state of charge SOC and the accepted maximum power table PAC_MIN_TC as a function of the state of charge SOC. More particularly, the maximum power is given by:

$$P_{ACMax}^t = f_{PAC\_MAX\_TC}(SOC^t)$$

Likewise, the minimum power is given by:

$$P_{ACMin}^t = f_{PAC\_MIN\_TC}(SOC^t)$$

If the power setpoint is in the interval $[P_{ACMin}, P_{ACMax}]$, then the power $P_{ac}$ is equal to the power setpoint $P_{ac\_sp}$. Otherwise, the power $P_{ac}$ is equal to the limit power $P_{ACMin}/P_{ACMax}$ closest to the power setpoint $P_{ac\_sp}$.

Moreover, the state of charge time variation $$\frac{dSOC}{dt}$$

can be calculated using the state of charge variation table (SOCV-TC) of the system as a function of the power setpoint $P_{ac\_sp}$ and a state of charge SOC using the following relationship:

$$\frac{dSOC^t}{dt} = f_{SOCV_{TC}}(SOC^t, P_{ac\_sp}^t)$$

It is interesting to note that only the initial state of charge $SOC_{ini}$ value is necessary, the next state of charge values being determined using the following relationship:

$$SOC^{t+1} = SOC^t + \frac{dSOC^t}{dt} \times t_{ESS}$$

It is important to note here that when the system is simulated using a model according to the invention, the time step between two iterations is not equal to $\Delta t$, but to the duration $t_{ESS}$ used upon implementing the method according to a first aspect of the invention. However, since correspondence tables of the model have been calculated from simulations performed with a time step $\Delta t$, the accuracy of the results obtained with the simplified model remains very close (cf. FIG. 9) to those obtained with a complex model, without however requiring as many computational resources. In other words, the simplified model obtained using a method according to a first aspect of the invention makes it possible to switch from a simulation time step equal to $\Delta t$ to a simulation step equal to $t_{ESS}$ without a significant loss in the accuracy of the results obtained. Thereby, all the interest of such a model is understood, in particular in driving an energy storage system.

For this, one embodiment of a second aspect of the invention relates to a method for driving an energy storage system ESS calculating operating power setpoints of said ESS system from a model of said system characterised in that said model is obtained using a method 100 according to one of the preceding claims.

For example, the method can comprise a first initialising phase during which a method 100 according to a first aspect of the invention is implemented. At the end of this first phase, the method comprises a second phase during which setpoints intended for the energy storage system are generated at regular intervals using the model obtained during the initialising phase so as to drive said ESS system. Generally, said setpoints take the form of an optimum driving trajectory the calculation of which is performed for a given time horizon, typically in the order of several hours, for example 12h. This trajectory is regularly updated according to an update period $t_{PIL}$, generally several times per hour, for example every 15 minutes. For each update (every 15 min for example), a simulation covering the trajectory horizon (12 h for example) should be made within the driving system. This update takes account of the evaluation of the state of charge of the storage system and, possibly, information relating to parameters likely to influence the evaluation of the system (as weather forecast information if the storage system is connected to a renewable energy source for example). This update is performed using a simulation the time step of which is equal to the duration $t_{ESS}$, for example 1 minute, said simulation being performed using a simplified model obtained by a method according to a first aspect of the invention. It is interesting to note that with a complex model according to a prior art, a simulation time step of one minute would not enable a sufficient accuracy to be obtained to perform an update of the driving trajectory. It would thus be necessary to decrease the simulation time step and thus to increase the calculation time as well as resources necessary for this calculation. The simplified model obtained using a method according to a first aspect of the invention enables this technical problem to be solved by actually enabling a time step much higher than that of prior art to be adapted without causing significant losses in the accuracy of the driving trajectory.

During the first initialising phase, it is thus preferable to take account of the duration $t_{PIL}$ separating two updates of the trajectory. For this, in one embodiment, the simulation duration $t_{ESS}$ is chosen such that $t_{ESS}<t_{PIL}$, preferably such that $n \times t_{ESS}=t_{PIL}$, with n being a positive integer. Thus, if the duration $t_{PIL}$ separating two updates of the driving trajectory is known, it is possible to choose the most suitable simulation time step $t_{ESS}$.

In order to implement such a method, one embodiment of a third aspect of the invention relates to a device for driving an energy storage system ESS comprising means for sending operating setpoints to the energy storage system ESS and means for receiving data relating to the operation of the energy storage system ESS. For example, the driving device and the energy storage system ESS communicate through an Ethernet network and the driving device includes an Ethernet type network card. The driving device also includes means for implementing a regulation method 100 according to the preceding claim. The driving device can include in particular means for inputting data relating to the complex model about the energy storage device DSE and/or the conversion device DC, as a keyboard associated with a screen or a touch screen. Alternatively or complementarily, the driving device includes a means for connecting to a network, for example the Internet, and the data relating to the complex model associated with the energy storage system ESS are recovered on a server, for example the manufacture's server of the conversion DC and energy storage DE devices said ESS system includes. The driving device also includes calculation means, for example a processor or an ASIC card, said calculation means enabling the steps of the method according to a first aspect of the invention to be performed in order to obtain a simplified model of the energy storage system, but also to generate operating setpoints from said simplified model.

The invention claimed is:

1. A method for driving an energy storage system, the energy storage system comprising an energy storage device that stores energy and a conversion device that converts energy stored by the energy storage device, the method comprising:
    operating the energy storage system by storing energy in the energy storage device or by converting energy by the conversion device, or both, said operating being performed using one or more operating setpoints that are received by the energy storage system;
    determining updated values of the one or more operating setpoints of the energy storage device by performing on a computer a simulation of an operation of the energy storage system using a simplified model of the energy storage system, the performing including
        determining parameters of the simplified model of the energy storage system, said energy storage system being able to be modelled by a complex model including an energy storage device model and a conversion device model; said complex model receiving as an input a power setpoint $P_{ac\_sp}$ and a state of charge $SOC_p$, and outputting the state of charge SOC of the storage device as well as the power $P_{ac}$ output from the storage device; said determining comprising:
        a first step of implementing a plurality of simulations of the energy storage system using the complex model;
        a second step of calculating from the results obtained during the first step:
            a state of charge time variation table of the system as a function of the power setpoint $P_{ac\_sp}$ and the state of charge SOC;
            a maximum power table as a function of the state of charge SOC;
            a minimum power table as a function of the state of charge SOC;
        the state of charge time variation table of the system, the maximum power table and the minimum power table forming the parameters of the simplified model, said simplified model enabling a power $P_{ac}$ and a state of charge of the energy storage system SOC to be assigned as a function of an input power setpoint $P_{ac\_sp}$ and an input state of charge $SOC_p$, and from the charge time variation table, the maximum power table and the minimum power table determined during the second step, and
    controlling operation of the energy storage system by inputting the updated values of the one or more operating setpoints into the energy storage device.

2. The method according to claim 1, wherein each value of the state of charge variation table of the system is obtained using a simulation with a duration $t_{ESS}$ performed for a given state of charge $SOC(j)$ and a given power setpoint $P_{ac\_sp}(i)$ which belongs to a first sub-set of the plurality of simulations, said value being:
    equal to the state of charge variation $\Delta SOC$ value obtained during said simulation over the time $t_{ESS}$ given by $$\frac{\Delta SOC}{t_{ESS}}$$

if the mean power $\langle P_{ac}\rangle$ during said simulation is equal to the power setpoint $P_{ac\_sp}$ otherwise, equal to:

$$interp\left\{[P_{ac\_sp}(i-1), <P_{ac}(i,j)>], \left[\frac{dSOC(i-1,j)}{dt}, \frac{\Delta SOC(i,j)}{t_{ESS}}\right], P_{ac\_sp}(i)\right\}$$

with:

$$\frac{dSOC(i-1,j)}{dt},$$

the charge variation obtained during the simulation corresponding to the state of charge SOC(j) and to a power setpoint $P_{ac\_sp}(i-1)$;

$\Delta SOC(i,j)$, the charge variation obtained during the simulation corresponding to the state of charge SOC(j) and to a power setpoint $P_{ac\_sp}(i)$;

$\langle P_{ac}(i,j)\rangle$, the mean value of the power $P_{ac}$ during the simulation corresponding to the state of charge SOC(j) and to a power setpoint $P_{ac\_sp}(i)$;

interp $\{[x_0, x_1], [y_0, y_1], x\}$ is the function which determines the y value corresponding to the x value by interpolation from the $x_0$, $x_1$, $y_0$ and $y_1$ values.

3. The method according to claim 1, wherein each value of the state of charge variation table of the system is obtained using a simulation with a duration $t_{ESS}$ performed for a given state of charge SOC(j) and a given power setpoint $P_{ac\_sp}(i)$ which belongs to a first sub-set of the plurality of simulations, said value being equal to the state of charge variation $\Delta SOC$ value obtained during said simulation over the time $t_{ESS}$.

4. The method according to claim 1, wherein each value of the state of charge time variation table of the system is obtained using a simulation with a duration $t_{ESS}$ performed for a given state of charge SOC(j) and a given power setpoint $P_{ac\_sp}(i)$ belonging to a first sub-set of the plurality of simulations, said value being:

equal to the state of charge variation $\Delta SOC$ value obtained during said simulation over the time $t_{ESS}$ given by $$\frac{\Delta SOC}{t_{ESS}}$$

if the mean power $\langle P_{ac}\rangle$ during said simulation is equal to the power setpoint $P_{ac\_sp}$ otherwise, equal to $$\frac{dSOC(m,j)}{dt}$$

where $$\frac{dSOC(m,j)}{dt}$$

is the charge variation obtained during the simulation corresponding to the state of charge SOC(j) and to the power setpoint $P_{ac\_sp}(m)$, $P_{ac\_sp}(m)$ being the power setpoint closest to the power setpoint $P_{ac\_sp}(i)$ for which the mean power $\langle P_{ac}\rangle$ during said simulation is equal to the power setpoint $P_{ac\_sp}(m)$.

5. The method according to claim 1, wherein each state of charge SOC(j) is separated from the previous one SOC(j−1) and/or the next one SOC(j+1) by an adaptive state of charge step and/or each power setpoint $P_{ac\_sp}(i)$ is separated from the previous one $P_{ac\_sp}(i-1)$ and/or the next one $P_{ac\_sp}(i+1)$ by an adaptive power setpoint step.

6. The method according to claim 3, wherein the simulation step is repeated for a plurality of durations $t_{ESS}$.

7. The method according to claim 1, wherein the plurality of simulations includes a simulation performed with an initial state of charge $SOC_{ini}$ equal to the maximum state of charge $SOC_{max}$, a duration equal to the duration necessary for fully discharging the storage system $t_{Dch}$ and a positive infinite power setpoint $P_{ac\_sp}$ and wherein calculating the maximum power table as a function of the state of charge SOC includes:

a step of determining periods with a duration $t_{ESS}$ within said simulation, each period being identified by means of a positive integer k;

for each of these periods, a step of determining the state of charge $SOC_k$ at the beginning of the period k and the mean power $\langle P_{ac}\rangle_k$ during the period k;

the plurality of couples ($SOC_k$, $\langle P_{ac}\rangle_k$) making up the maximum power table.

8. The method according to claim 1, wherein the plurality of simulations includes a simulation performed with an initial state of charge $SOC_{ini}$ equal to the minimum state of charge of $SOC_{min}$, a duration equal to the duration necessary for fully discharging the storage system $t_{Ch}$ and a negative infinite power setpoint $P_{ac\_sp}$ and wherein calculating the minimum power table as a function of the state of charge SOC includes:

a step of determining periods with a duration $t_{ESS}$ within said simulation, each period being identified by means of a positive integer k';

for each of these periods, a step of determining the state of charge $SOC_{k'}$ at the beginning of the period k' and the mean power $\langle P_{ac}\rangle_{k'}$ during the period k';

the plurality of couples ($SOC_{k'}$, $\langle P_{ac}\rangle_{k'}$) making up the minimum power table.

9. A device for driving an energy storage system comprising means for sending operating setpoints to the energy storage system, means for receiving data relating to the operation of the energy storage system, and means for implementing a regulation method for driving the energy storage system, the energy storage system comprising an energy storage device that stores energy and a conversion device that converts energy stored by the energy storage device, the method comprising:

operating the energy storage system by storing energy in the energy storage device or by converting energy by the conversion device, or both, said operating being performed using the operating setpoints that are received by the energy storage system;

determining updated values of the operating setpoints of the energy storage device by performing on a computer a simulation of an operation of the energy storage system using a simplified model of the energy storage system, the performing including determining parameters of the simplified model of the energy storage system, said energy storage system being able to be modelled by a complex model including an energy storage device model and a conversion device model; said complex model receiving as an input a power setpoint $P_{ac\_sp}$ and a state of charge $SOC_p$, and outputting the state of charge SOC of the storage device as well as the power $P_{ac}$ output from the storage device; said method determining comprising:

a first step of implementing a plurality of simulations of the energy storage system using the complex model;

a second step of calculating from the results obtained during the first step:
- a state of charge time variation table of the system as a function of the power setpoint $P_{ac\_sp}$ and the state of charge SOC;
- a maximum power table as a function of the state of charge SOC;
- a minimum power table as a function of the state of charge SOC;

the state of charge time variation table of the system, the maximum power table and the minimum power table forming the parameters of the simplified model, said simplified model enabling a power $P_{ac}$ and a state of charge of the energy storage system SOC to be assigned as a function of an input power setpoint $P_{ac\_sp}$ and an input state of charge $SOC_p$, and from the charge time variation table, the maximum power table and the minimum power table determined during the second step, and controlling operation of the energy storage system by inputting the updated values of the operating setpoints into the energy storage device.

\* \* \* \* \*